US006804429B2

(12) United States Patent
Yu et al.

(10) Patent No.: US 6,804,429 B2
(45) Date of Patent: Oct. 12, 2004

(54) RECONFIGURABLE WAVELENGTH MULTIPLEXERS AND FILTERS EMPLOYING MICROMIRROR ARRAY IN A GIRES-TOURNOIS INTERFEROMETER

(75) Inventors: Kyoungsik Yu, Stanford, CA (US); Olav Solgaard, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 309 days.

(21) Appl. No.: 10/072,639

(22) Filed: Feb. 8, 2002

(65) Prior Publication Data

US 2003/0058520 A1 Mar. 27, 2003

Related U.S. Application Data

(60) Provisional application No. 60/267,539, filed on Feb. 9, 2001.

(51) Int. Cl.[7] .............................................. G02B 6/293
(52) U.S. Cl. .......................................... 385/24; 385/47
(58) Field of Search ............................. 385/24, 27, 18, 385/15, 47; 356/451, 452, 454, 519; 359/578, 579

(56) References Cited

U.S. PATENT DOCUMENTS

| | | | | | |
|---|---|---|---|---|---|
| 5,071,225 A | * | 12/1991 | Inoue | ............................ | 359/634 |
| 5,459,610 A | | 10/1995 | Bloom et al. | ................ | 359/572 |
| 5,808,797 A | | 9/1998 | Bloom et al. | ................ | 359/572 |
| 6,169,604 B1 | | 1/2001 | Cao | ............................ | 356/519 |
| 6,252,716 B1 | * | 6/2001 | Paiam | .......................... | 359/618 |
| 6,275,324 B1 | | 8/2001 | Sneh | ............................ | 359/291 |
| 6,292,298 B1 | * | 9/2001 | Glance | ........................ | 359/583 |
| 6,304,689 B1 | | 10/2001 | Dingel et al. | .................. | 385/24 |
| 6,310,690 B1 | | 10/2001 | Cao et al. | .................... | 356/519 |
| 6,313,936 B1 | | 11/2001 | Holmes | ........................ | 359/250 |
| 6,327,398 B1 | | 12/2001 | Solgaard et al. | ............... | 385/18 |
| 2003/0021525 A1 | * | 1/2003 | Turpin et al. | .................. | 385/24 |
| 2003/0035216 A1 | * | 2/2003 | Hatano et al. | .............. | 359/578 |

OTHER PUBLICATIONS

C. K. Madsen et al., A tunable dispersion compensating MEMS all–pass filter. IEEE Photonics Technology Letters, vol. 12 No. 6, pp. 651–653. Jun. 2000.*

Yu, et al., "Wavelength–Time Spreading Optical CDMA System Using Wavelength Multiplexers and Mirrored Fiber Delay Line," IEEE Photonics Technology Letters, vol. 12, No. 9, pp. 1278–1280, Sep. 2000.

Solgaard et al., "Deformable Grating Optical Modulator," Optics Letters, vol. 17, No. 9, May 1992.

(List continued on next page.)

*Primary Examiner*—Brian Healy
*Assistant Examiner*—Mike Stahl
(74) *Attorney, Agent, or Firm*—Lumen Intellectual Property Services, Inc.

(57) ABSTRACT

A reconfigurable optical device capable of filtering, multiplexing, and spectrometry, among other functions. The device has an array of micromirrors disposed under a floating reflector that is partially reflecting. The floating reflector is spaced apart from the micromirrors a certain distance. The micromirrors are each capable of independent vertical motion, and, optionally, tilting motion. In use, light is projected at an oblique angle into the space between the micromirrors. Each reflection from the floating reflector produces an emergent beam from the floating reflector. The emergent light beams are combined with a lens. As a direct result of this structure, different wavelengths are focused to different points in the focal plane of the lens. The focal point positions of the different wavelengths can be moved by manipulating the micromirrors. This allows for reconfigurable filtering, spectrometry, and multiplexing, among other applications.

77 Claims, 16 Drawing Sheets

OTHER PUBLICATIONS

M. Shirasaki, "Chromatic–Dispersion Compensator Using Virtually Imaged Phased Array," IEEE Photonics Technology Letters, vol. 9, No. 12, pp. 1598–1600, Dec. 1997.

Shirasaki, et al., "Virtually Imaged Phased Array with Graded Reflectivity," IEEE Photonics Technology Letters, vol. 11, pp. 1443–1445, Nov. 1999.

Sasayama, et al., "Photonic FDM Multichannel Selector Using Coherent Optical Transversal Filter," Journal of Lightwave Technology, vol. 12, No. 4, pp. 664–669, Apr. 1994.

Bucci, et al., "Intersection Approach to Array Pattern Synthesis," IEEE Proceedings, vol. 137, No. 6, pp. 349–357, Dec. 1990.

* cited by examiner

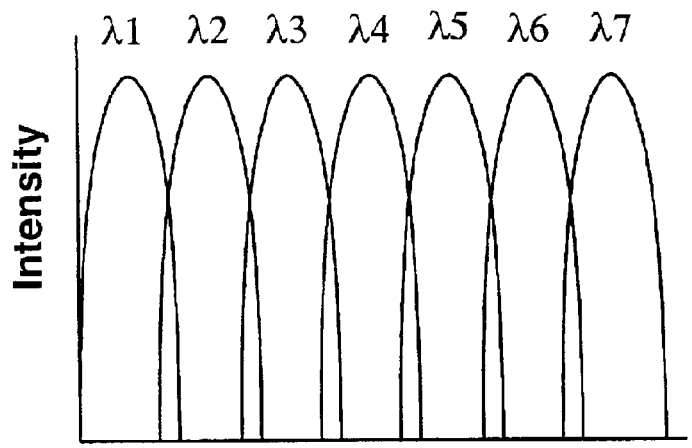
Fig. 9a  Focal Plane Position
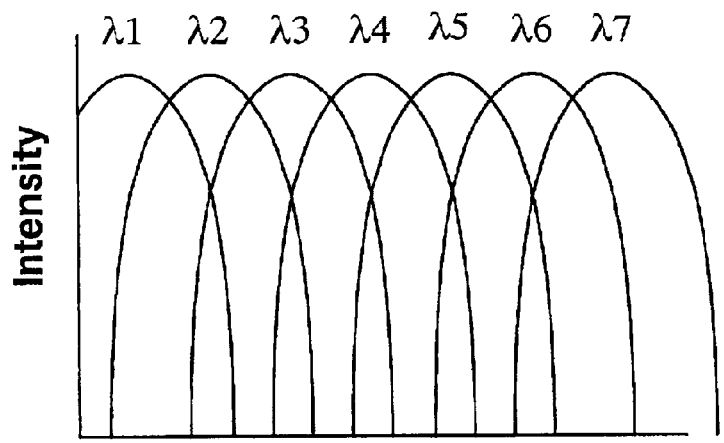
Fig. 9b  Focal Plane Position
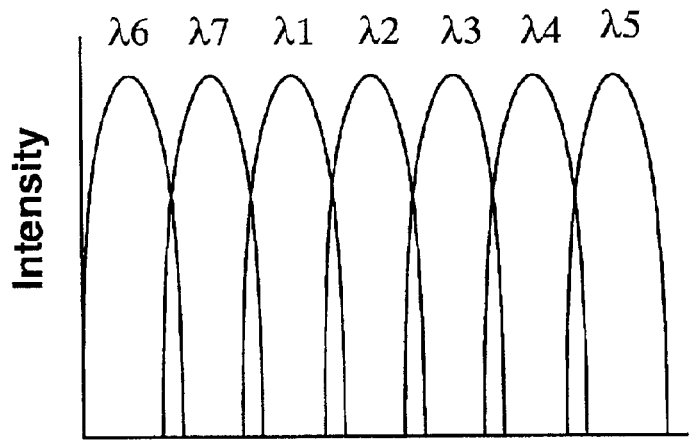
Fig. 10  Focal Plane Position Beam Energy vs. beam number for uniform-reflectivity reflector 26

Beam Energy and reflectivity vs. beam number for linearly graded-reflectivity reflector 26

Beam Energy vs. beam number
Uniform energy distribution

Beam Energy vs. beam number
Sinc function- energy distribution

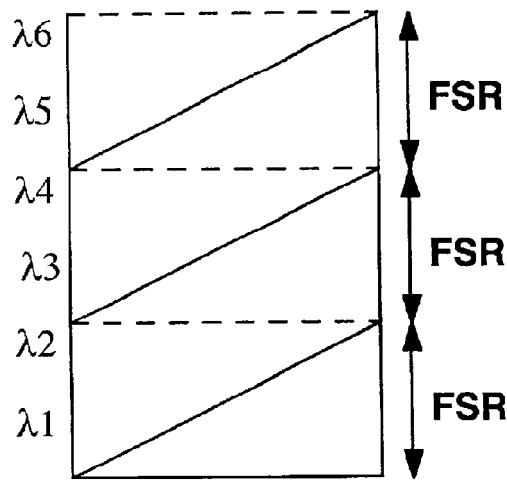
Fig. 20
Fig. 21
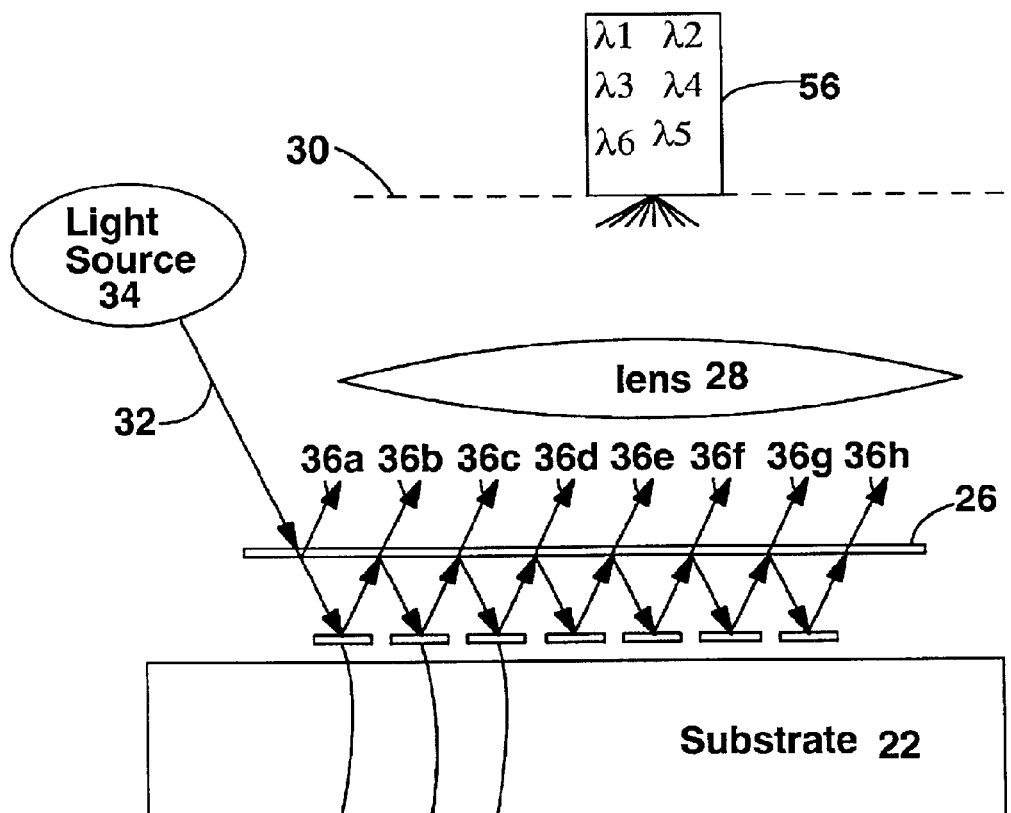
**Fig. 22

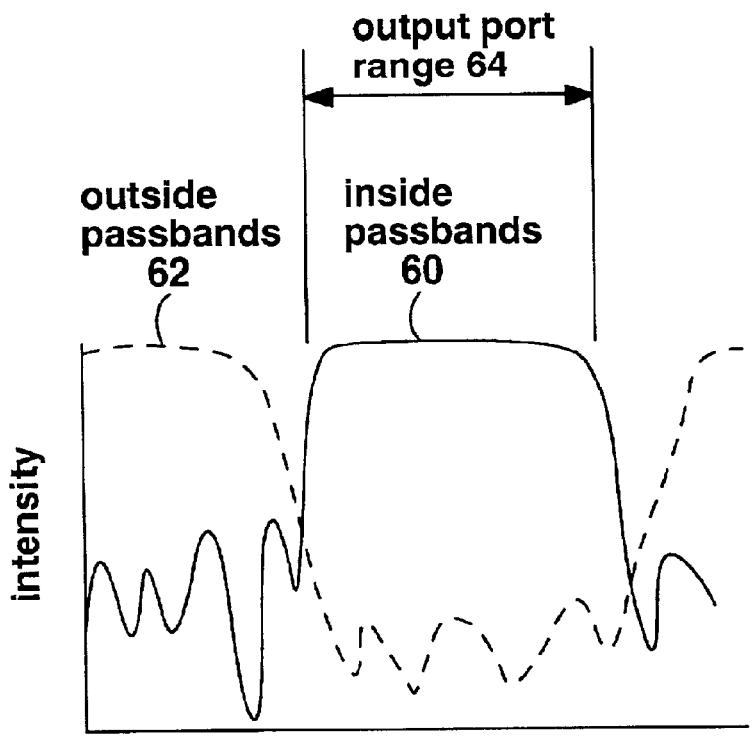
Fig. 24  position in focal plane
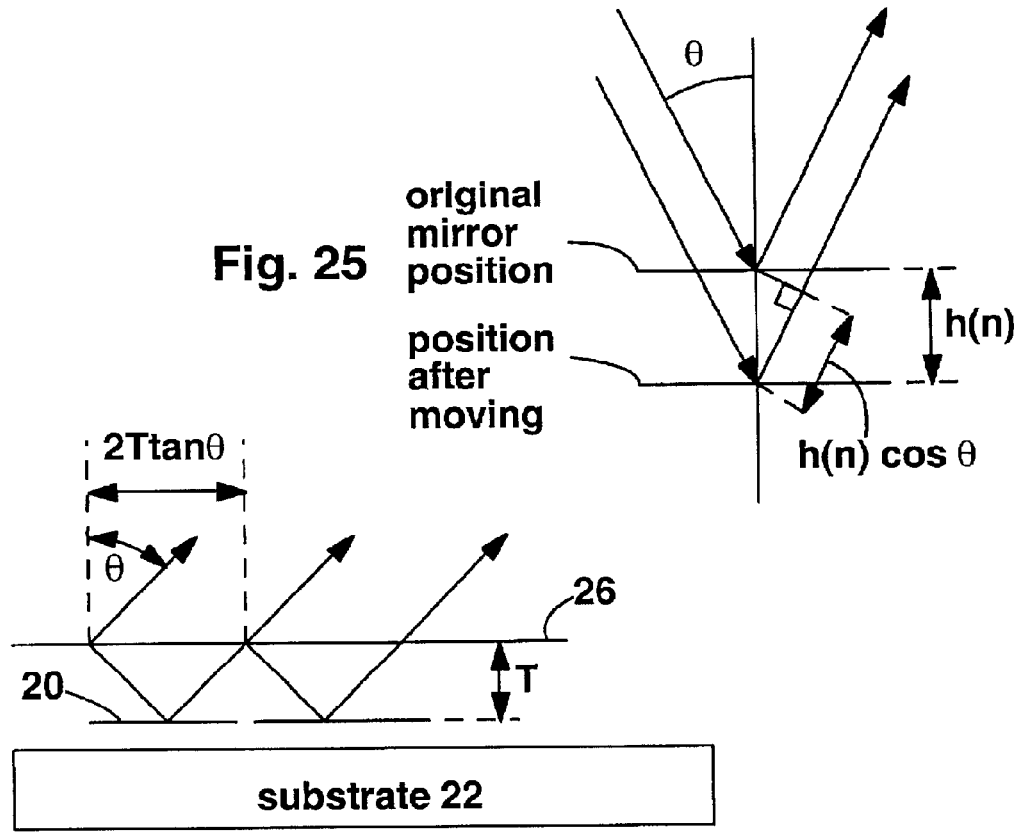
Fig. 25
Fig. 26

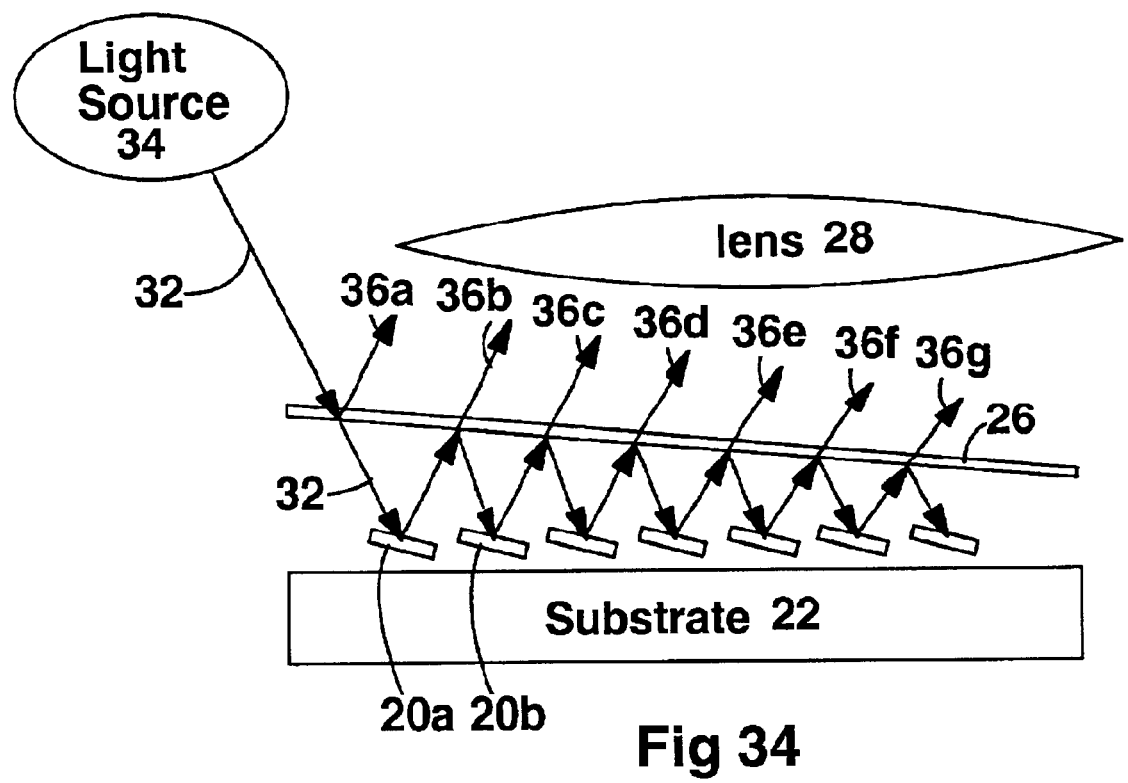

RECONFIGURABLE WAVELENGTH MULTIPLEXERS AND FILTERS EMPLOYING MICROMIRROR ARRAY IN A GIRES-TOURNOIS INTERFEROMETER

RELATED APPLICATIONS

The present application claims the benefit of priority from copending provisional patent application 60/267,539, filed on Feb. 9, 2001, and which is hereby incorporated by reference.

The development of this invention was supported in part by contract number MDA972-00-1-0032 from the Defense Advanced Research Projects Agency (DARPA). The Government has certain rights in the invention.

FIELD OF THE INVENTION

The present invention relates generally to optical communications (e.g., wavelength-division multiplexing, optical code division multiple access (OCDMA), and add-drop devices). Also, the present invention is applicable to spectrophotometry, and reconfigurable optical filters.

BACKGROUND OF THE INVENTION

In the field of optical communications there is presently a need for devices that can switch different wavelengths of light. For example, in wavelength-division multiplexed communications, often it is required for individual wavelengths to be connected to different ports (e.g. fibers or photodetectors). Also, optical add-drop multiplexers are needed to remove and then replace a single wavelength from an optical communication stream. These functions are especially difficult to implement if the device must be reconfigurable, or if the wavelengths to be manipulated are very close.

Also, optical communications can benefit from reconfigurable optical filters that have a broadly controllable optical response. Reconfigurable optical filters have a number of applications in the optical sciences and optical communications generally.

The present invention provides a reconfigurable optical device that can provide multiplexing, coding, spectrometer, and filtering functions.

SUMMARY OF THE INVENTION

The present invention provides an optical device having a partially reflecting, partially transmitting reflector, a movable mirror, and a light collimator. The movable mirror is spaced apart from and parallel with the reflector. The movable mirror can be moved to vary the spacing between the mirror and the reflector. The light collimator is disposed to project a light beam between the reflector and mirror at an oblique angle. An emergent beam is transmitted by the reflector each time the light beam reflects from the reflector. The emergent beams are spaced apart and preferably do not overlap.

The mirror can be a single large movable mirror. In this case, the light beam reflects from the mirror multiple times; each reflection is at a different position on the mirror because the light beam travels at an oblique angle.

Alternatively, the mirror can comprise an array (e.g. a linear array) of separately movable micromirrors. Each micromirror can move vertically to vary a spacing between the micromirror and the reflector. The micromirror array can have 1–1000 micromirrors, for example. The light beam can reflect at most once from each micromirror. Alternatively, the light beam can reflect 2 or 3 or more times from each micromirror.

The device can further comprise a lens for collecting the emergent beams and focusing them at a focal plane.

Alternatively, the mirror or micromirrors can comprise a controllable diffraction grating. The diffraction grating can vary the energy in the emergent beams.

The reflector can have a uniform or nonuniform reflectivity. The reflectivity of the reflector can be graded to provide a desired energy distribution among the emergent beams.

DESCRIPTION OF THE FIGURES

FIGS. 9a and 9b show for different spot sizes the intensity distribution in the focal plane for different wavelengths in the device of FIG. 4.

FIG. 10 illustrates the intensity distribution in the focal plane for different wavelengths in the case of wavelength cycling.

FIGS. 20 and 21 are a graph and a chart illustrating how the device of FIG. 19 distributes wavelengths in the focal plane.

FIG. 22 shows a reconfigurable optical filter according to the present invention.

FIG. 24 shows a plot of intensity vs. focal plane position for the optical filter of FIG. 22.

FIGS. 25, 26, and 27 illustrate concepts in the derivation of a mathematical model of the present invention.

FIG. 34 shows an embodiment where the reflector is not parallel with the array of micromirrors.

DETAILED DESCRIPTION

The present invention provides a reconfigurable optical device capable of filtering, multiplexing, and spectrometry, among other functions. The device has an array of micromirrors disposed under a floating reflector that is partially reflecting. The floating reflector is spaced apart from the micromirrors a certain distance, for example, 10–2500 microns. The micromirrors are each capable of independent vertical motion. In use, light is projected at an oblique angle into the space between the micromirrors and the floating reflector so that the light reflects back and forth between the floating reflector and micromirrors. Each reflection from the floating reflector produces an emergent beam from the floating reflector. Each reflection from a micromirror allows the micromirror to adjust the phase (and, in some embodiments, the amplitude) of the emergent beam. The emergent beams are combined with a lens. As a direct result of this structure, different wavelengths are focused to different points in the focal plane of the lens. Also, the focal point positions of the different wavelengths can be moved by manipulating the micromirrors. This allows for reconfigurable filtering, spectrometry, and multiplexing, among other applications.

Figure 1:
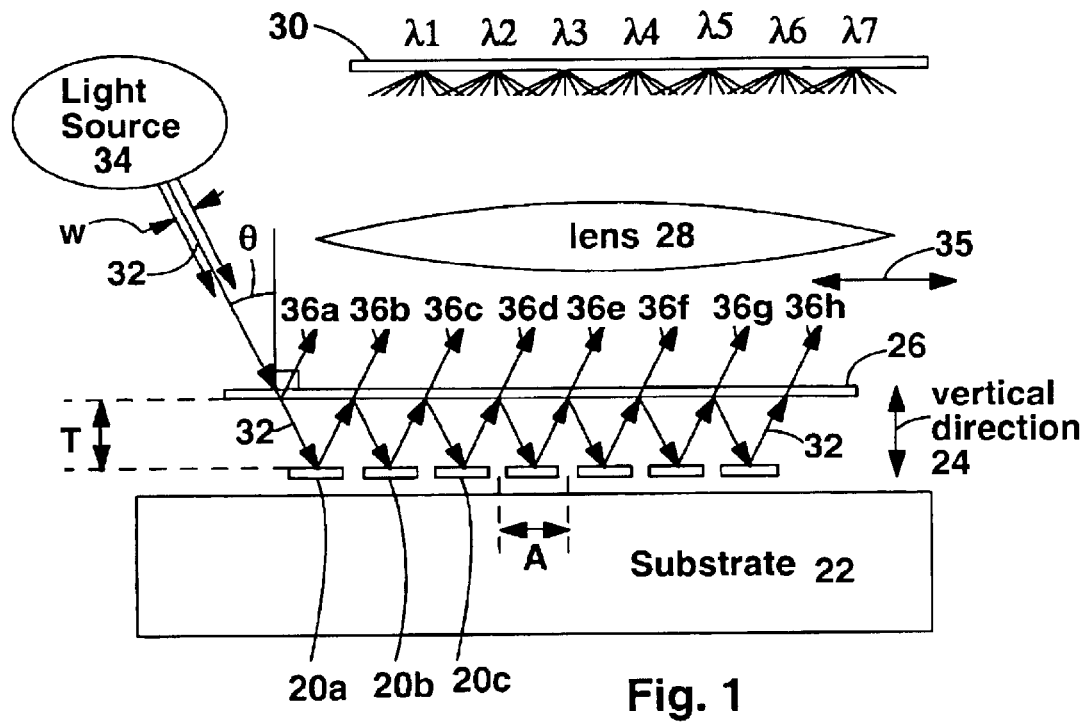
FIG. 1 shows a wavelength demultiplexer according to the present invention.

FIG. 1 shows a side view of an exemplary embodiment of the present invention. Micromirrors 20 (individual micromirrors are labeled 20a, 20b, 20c . . . ) are disposed on a substrate 22 in a linear array. Each micromirror 20 can be independently moved in a vertical direction 24. The micromirrors have a period spacing A. A floating reflector 26 is disposed above the micromirrors 20 by a spacing distance T. The spacing T can be used to describe the positions of individual micromirrors 20, since they are movable. The floating reflector 26 is partially reflecting and partially transmitting and is held above the micromirror on posts (not shown) or other supporting structure. A lens 28 is disposed above the floating reflector to capture emergent beams 36 transmitted by the reflector 26. The lens 28 has a focal plane 30 where light patterns are created by the lens 28.

In operation, a collimated light beam 32 from a light source 34 is projected into the space between the reflector 26 and micromirrors 20 at an angle θ (θ is typically about 2–15 degrees, and is measured from the surface normal). The light beam 32 will typically comprise several discrete wavelengths, or a continuous range of wavelengths. The light beam 32 reflects back and forth between the micromirrors 20 and the reflector 26. With each reflection from the reflector 26, an emergent beam 36 (individual emergent beams are labeled 36a, 36b, 36c . . . ) is transmitted toward the lens 28. The emergent beams 36 are spaced apart in a horizontal direction 35, since the light beam 32 is directed at an oblique angle. Preferably, the emergent beams 36 are not overlapping, but they can be slightly overlapping (e.g. 10% energy overlap) in the present invention. The lens 28 focuses and combines the emergent beams 36 so that a certain light pattern is formed on the focal plane 30. The light pattern produced on the focal plane depends upon the amplitudes, angles, and relative phases of the emergent beams 36. Typically, the emergent beams 36 are parallel. Relative phases of the emergent beams 36 are controlled by moving the micromirrors 20 slightly in the vertical direction 24. Phase control of each emergent beam 36 provides control over where different wavelengths are focused on the focal plane 30, and control over the shape of the focus spots in the focal plane 30.

In the specific embodiment shown in FIG. 1, light beam 32 comprises seven discrete wavelengths λ1–λ7, as commonly known in the art of wavelength division multiplexing (WDM). λ1 is the shortest, and λ7 is the longest wavelength, and each of the wavelengths is separated by 1 nm. Each wavelength is focused to a separate point in the focal plane 30. This behavior allows the device to function as an optical multiplexer/demultiplexer. A demultiplexing function is provided by injecting the wavelengths λ1–λ7 in the direction shown (i.e., from light source to focal plane 30). A multiplexing function can be provided by injecting multiple wavelengths in the opposite direction, i.e. by propagating light from the focal plane 30 to the light source location.

The collimated light beam 32 has a width W preferably less than the size of the micromirrors 20. A light beam diameter smaller than the micromirrors 20 assures that light is not lost from the system by missing the micromirrors. For example, each micromirror can be about 150×150 microns in size, and the collimated light beam 32 can have a diameter of about 50 microns. With the micromirrors larger than the collimated beam diameter, little light will be lost if the light beam is properly aligned. The light beam 32 should remain somewhat collimated as it reflected between the micromirrors and the reflector. As the light beam 32 travels, optical power can be lost if the light beam expands to become larger than the micromirrors 20. It is noted that the micromirrors can have a concave shape so that the light is refocused with each reflection. Also, the reflector can have repeating concave sections so that the light is refocused with each reflection.

The spacing distance T between the micromirrors and the reflector 26 is essentially constant over the whole device (i.e. the micromirror 20 array and the reflector 26 can be planar parallel). Also, T can have a wide range of values, depending on the functionality desired. For example, T can be in the range of about 10–2500 microns, although larger or smaller values are within the scope of the present invention. T is an important design parameter that influences the free spectral range (FSR) of the device, and consequently, where different wavelengths are focused in the focal plane 30. FSR is described more fully below. Micromirrors 20 need only move a fraction of a wavelength to affect the phase of the emergent beams 36. Therefore, on a percentage basis, T changes only a very small amount (e.g. typically less than 1%) as the micromirrors are moved.

The micromirrors can be made of many materials used for micromachined structures including polysilicon, crystalline silicon, silicon nitride, SiO2, metals and the like. The micromirrors can be controlled using many different energy sources or fields, such as electrostatic fields or magnetic fields. For example, the micromirrors can be vertically actuated by electrostatic vertical dual-mode comb drives.

The micromirrors can be made according to many different micromachining processes known in the art. For example, the micromirrors can be made by surface micromachining processes such as the MUMPS® process provided by Cronos of MCNC in Research Triangle Park, North Carolina.

The light source 34 can be an optical fiber or waveguide carrying optical data information. The light can comprise many wavelengths multiplexed together as commonly known in wavelength division multiplexing arts. Also, the light source can also be a free space optical beam guided by bulk optical components.

The light beam 32 can be collimated by any known collimator device, such as a lens, hologram, curved mirror or the like. The light beam 32 can be collimated by a cylindrical lens that focuses the light in one dimension, or by a conventional lens that focuses light in two dimensions.

The micromirror period spacing A can be slightly larger than the micromirrors, so that the micromirrors are separated by small gaps. For example, the micromirrors can be in the range of about 50–200 microns square, and separated by 5–25 micron gaps, so that the mirror period spacing is in the range of about 55–225 microns. Larger or small values for micromirror size and period spacing are also contemplated by the inventors and are within the scope of the present invention.

The number of micromirrors 20 in the array, N, can be in the range of about 1–1000, although larger numbers of micromirrors 20 are within the scope of the present invention. The device of FIG. 1 has 7 micromirrors. The number of micromirrors 20 generally depends upon the resolution desired for separating wavelengths. With all other factors being equal, a larger number of micromirrors provides greater wavelength resolving power. It is noted that the present invention includes an embodiment having a single movable mirror to vary the gap spacing T; in this embodiment, the light beam 32 can reflect from the single mirror multiple times.

The number of emergent beams 36 in the array is typically equal to the number of micromirrors N, or N+1 (if the light beam 32 is incident on the reflector 26 as shown in FIG. 1), but not necessarily so. The number of emergent beams 36 can be greater than the number of micromirrors if the light beam 32 reflects from each micromirror multiple times. The number of emergent beams 36 in the present invention must be at least 2, and can be 1000 or more. In the present description, the number of emergent beams 36 is given by the variable M.

The lens 28 can be a lens assembly comprising multiple lenses for diffraction-limited focusing. The lens can also be a holographic element or any other device providing a focusing function.

The substrate can be any substrate used for fabricating microoptical, or microelectromechanical (MEM) devices. The substrate can be made of silicon, which is commonly used for micromechanical devices, or can be made of other materials such as ceramic, glass, or metal.

The reflector 26 can be made of a dielectric, semiconductor or metallic thin films (e.g. silicon nitride, SiO2, silicon, aluminum) or combination of materials (e.g. multiple layers). The reflector can be a free standing thin film or a second 30 substrate having substantial thickness.

Application in Multiplexing/Demultiplexing

In the present invention, the free spectral range (FSR) of the device is very important for characterizing the device behavior. In the present invention, the FSR is approximately:

$$FSR \cong \frac{\lambda^2}{2T\cos\theta}$$

where $\lambda$ is approximately the wavelengths used in the device (e.g. if a range of 1530–1580 nm is used, $\lambda$ in the above equation can be about 1550 nm), T is the micromirror-reflector spacing, and $\theta$ is the incidence angle. In the present invention, the FSR is the wavelength range that can be resolved in the focal plane without multiple wavelengths being focused to the same position in the focal plane (i.e. overlapping); this is more fully explained below.

Figure 2:
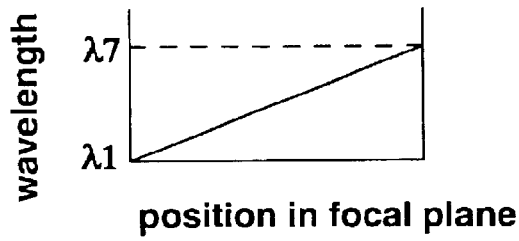
FIG. 2 shows a plot of wavelength vs. focal plane position for the device of FIG. 1.
Figure 3:
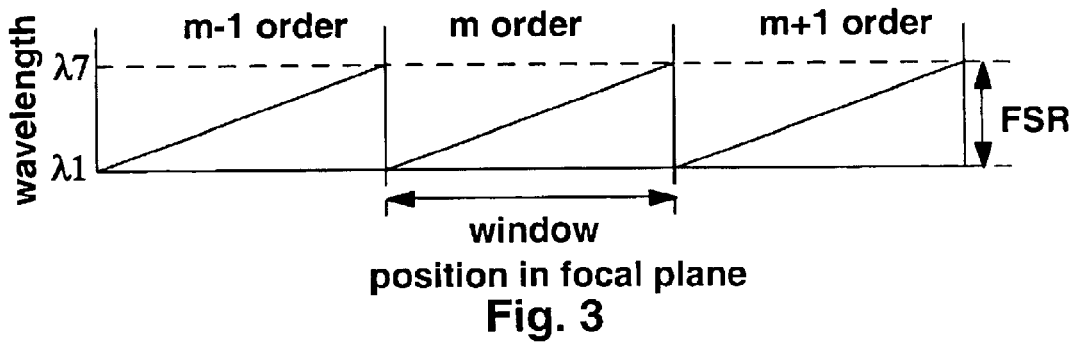
FIG. 3 shows an expanded plot of wavelength vs. focal plane position.

In the present invention, wavelengths are distributed in the focal plane so that there is a well-defined correspondence between wavelength and position in the focal plane. FIG. 2, for example, shows a plot of wavelength versus focal plane position (in the instance where all micromirrors have the same value of T). Wavelength varies approximately linearly with linear position in the focal plane. A larger view of the wavelength vs. focal plane position in FIG. 3 reveals that the wavelength pattern repeats in the focal plane. Each repeating unit is called a 'window' in the present description (typically, a window can be about 0.5–3 mm wide, for example). The wavelength range in each repeating 'window' is equal to the FSR of the device. Each window corresponds to a different diffraction order. Typically (and desirably), most of the optical energy is located in a single window, but the invention is not so limited. In the example of FIGS. 2 and 3, the FSR is equal to the wavelength range $\lambda1$–$\lambda7$, or 7 nm.

Figures 4, 5:
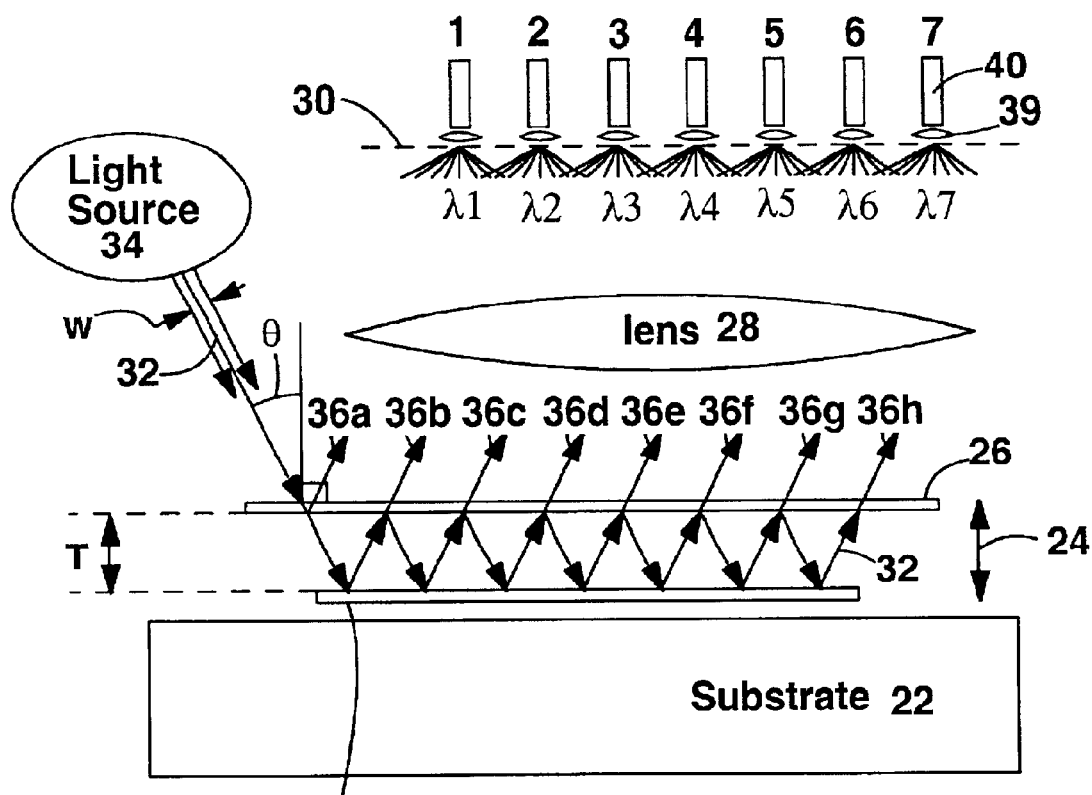
FIG. 4 shows a demultiplexer according to the present invention having a single large movable mirror.
FIG. 5 is a chart illustrating how the device of FIG. 4 divides different wavelengths among optical fibers.

FIG. 4 shows an alternative embodiment of the invention where the micromirrors 20 are replaced with a single movable mirror 42. In this embodiment, movement of the mirror 42 can shift the wavelengths in the focal plane. The device of FIG. 4 is shown being used as a demultiplexer, although application as a multiplexer is also possible. Here, microlenses 39 (optional) are used to focus the wavelengths $\lambda1$–$\lambda7$ into seven optical fibers 40 (microlenses and optical fibers may be referred to herein as output ports). The lenses 39 and fibers 40 are located at or near the focal plane 30. The optical fibers 40 are numbered 1–7 as shown. In this example, $\lambda1$–$\lambda7$ can be wavelengths separated by 1 nm and centered around 1550 nm. In the present specification, $\delta\lambda$ indicates wavelength spacing between adjacent channels (1 nm in example above), and $\Delta\lambda$ indicates a total input wavelength range of input light (7 nm in example above)

In the present reconfigurable optical demultiplexer, the wavelengths $\lambda1$–$\lambda7$ can be switched between the optical fibers 1–7 by moving the mirror 42 in the vertical direction 24. With the specific micromirror setting of FIG. 4, optical fiber 1 receives $\lambda1$, optical fiber 2 receives $\lambda2$, and so on.

FIG. 5 shows a chart illustrating which fibers 40 receive which wavelengths for certain positions of mirror 42 in the device of FIG. 4. Each column corresponds to a different mirror position. Column 1 of FIG. 5 for example corresponds to the wavelength pattern shown in FIG. 4. From FIG. 7 it is apparent that the wavelengths $\lambda1$–$\lambda7$ 'cycle' through all the optical fiber ports as spacing T is varied. A wavelength that cycles past optical fiber 7 reappears at optical fiber 1. If the mirror is moved a relatively large distance, eventually the pattern repeats, as illustrated by column 8, which is the same as column 1.

It is important to note that mirror 42 moves a very small amount to cause the wavelengths to shift. The required vertical displacement is a small fraction of the wavelength used (e.g. $\frac{1}{10}\lambda$ to $\frac{1}{2}\lambda$ for example). 1530–1580 nm may be a typical wavelength range used, and T may be about 50–400 microns, so T is not significantly changed by mirror displacements required for wavelength shifting. Therefore, the FSR is not significantly changed as wavelengths are shifted between optical fibers 40.

Figure 6:
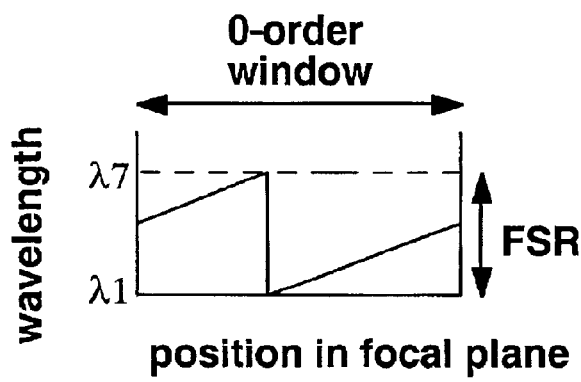
FIG. 6 illustrates how different wavelengths are distributed in the focal plane in the device of FIG. 4.

FIG. 6 shows another illustration of wavelength cycling in the zero order window only. In FIG. 6, the wavelengths have been shifted about halfway across the window.

Figure 7:
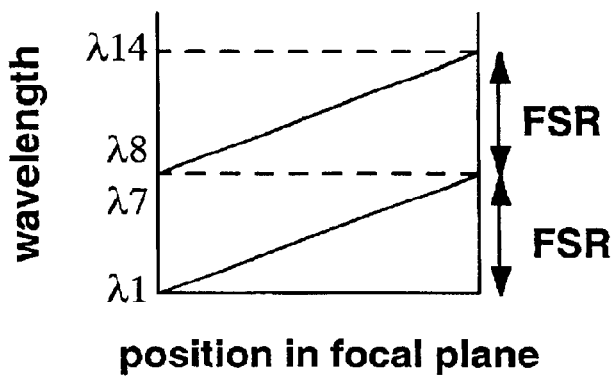
FIGS. 7 and 8 are a graph and chart illustrating the distribution of a large bandwidth input signal in a demultiplexer according to the present invention.
Figure 8:
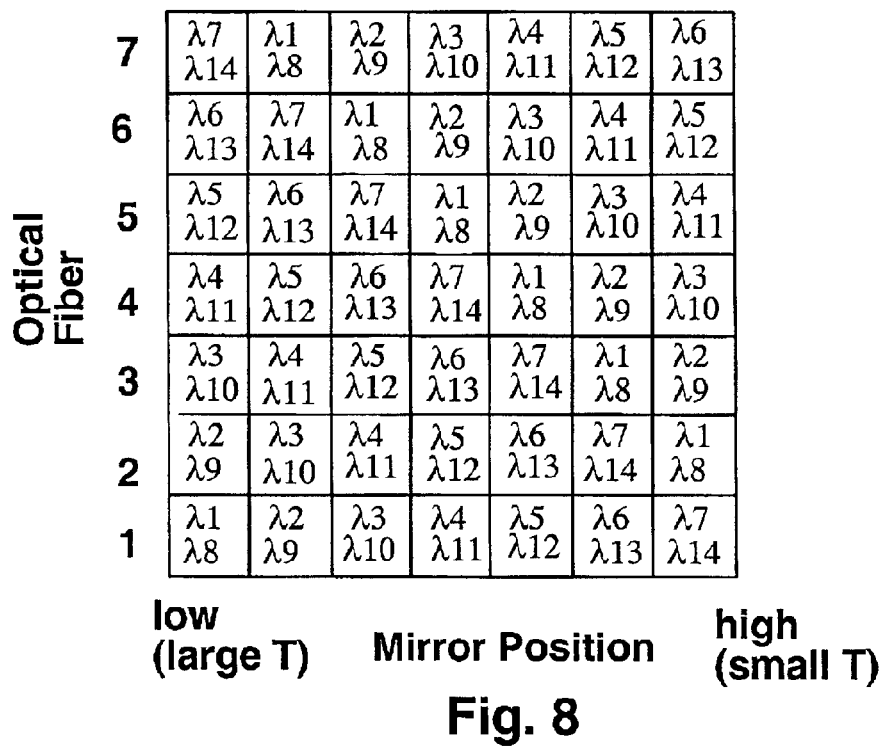

In many multiplexing and demultiplexing applications of the present invention, it is desirable for the total range of input wavelengths to be less than or equal to the FSR. If this condition is satisfied, then no two wavelengths will be focused to the same position in the focal plane. If the range of input wavelengths is greater than the FSR, then multiple wavelengths will be focused at the same positions. For example, FIG. 7 illustrates a situation where wavelengths λ1–λ14 are input into the device of FIG. 4. Wavelengths λ8–λ14 have the same δλ λ1–λ7 (1 nm); so wavelengths λ1–λ14 have a bandwidth Δλ (14 nm) twice the FSR (7 nm). In this case, λ1 and λ8 will be focused to the same position in the focal plane; λ2 and λ9 will be focused to the same position; λ3 and λ10 will be focused to the same position, and so on. FIG. 8 shows a chart illustrating wavelength cycling in the same manner as the chart of FIG. 5 (each column corresponds to a different vertical position for mirror 42). Wavelengths λ8–λ14 cycle in the same manner as wavelengths λ1–λ7.

Another important design consideration of the present device is the wavelength resolution, which influences crosstalk when the device is used as a demultiplexer. Each wavelength is focused to a spot having a finite spot size. The spot size, and crosstalk are related to the wavelength resolution of the device, which is defined as:

$$\text{Resolution} = \frac{1}{\Lambda} = \frac{M}{FSR}$$

where $\Lambda$ is the minimum wavelength difference between two separable wavelengths, M is the number of emergent beams 36, and FSR is the free spectral range defined above. The above equation assumes the emergent beams 36 have equal energy. Unequal energy distribution among the emergent beams will often, but not always, provide somewhat lower wavelength resolution.

High resolution is desirable for dense wavelength division multiplexing devices and many other applications. FIG. 9a and 9b illustrate exemplary light distributions in the focal plane 30 for high resolution and low resolution devices, respectively. The wavelength pattern of FIG. 9a can be changed to resemble the wavelength pattern of FIG. 9b by reducing the number of emergent beams 36 (e.g. by blocking some of the emergent beams 36), or by increasing the FSR, for example.

FIG. 10 is a plot of the wavelength pattern in the focal plane, further illustrating wavelength cycling, where the wavelengths λ1–λ7 have been shifted by two steps.

In the present invention, the reflector 26 can have a uniform reflectivity or graded (nonuniform) reflectivity. The reflectivity of the reflector strongly influences the amplitude of the emergent beams 36, which affects the device resolution.

Figure 11:
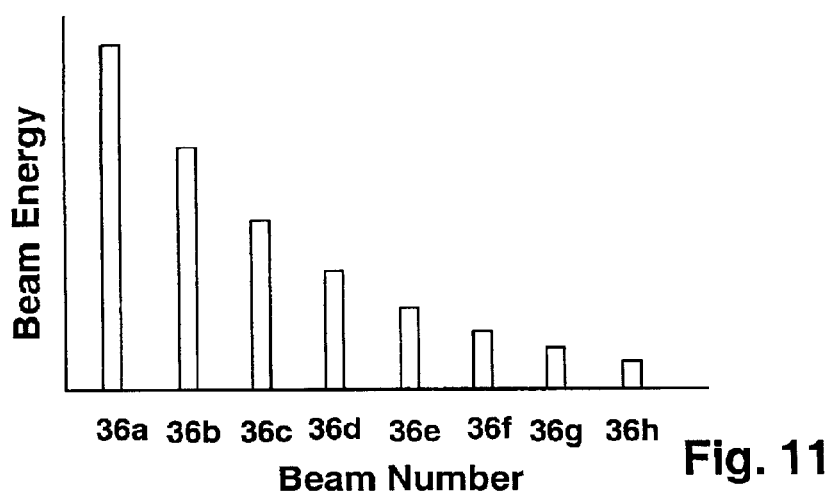
FIGS. 11, 12, 13, and 14 are graphs for different energy distributions among the emergent beams.

FIG. 11 shows a plot of emergent beam energy versus beam number for a device with the reflector 26 having uniform reflectivity. The energies of the emergent beams 36 is exponentially decreasing. Exponential beam energy distribution tends to result in a relatively low resolution.

Figure 12:
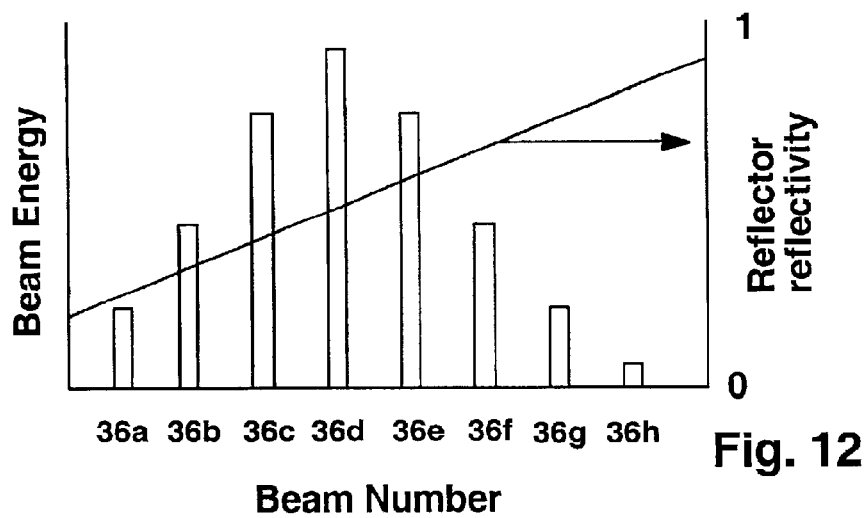

FIG. 12 shows a plot of beam energy and reflector reflectivity versus beam number for a device with a linearly graded reflectivity. Beams close to the middle (e.g. emergent beam 36d) tend to have the highest beam energy. This energy distribution tends to result in an improved wavelength resolution compared to the distribution of FIG. 11.

Figure 13:
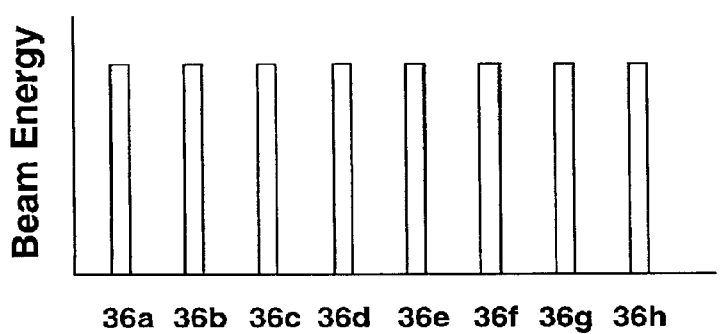

FIG. 13 shows a plot of beam energy versus beam number for a device with a uniform energy distribution among the beams 36. A uniform beam energy distribution tends to provide tightly focused spots for each wavelength. A uniform beam energy distribution can be provided by appropriately grading the reflector reflectivity, or by other techniques discussed below.

Figure 14:
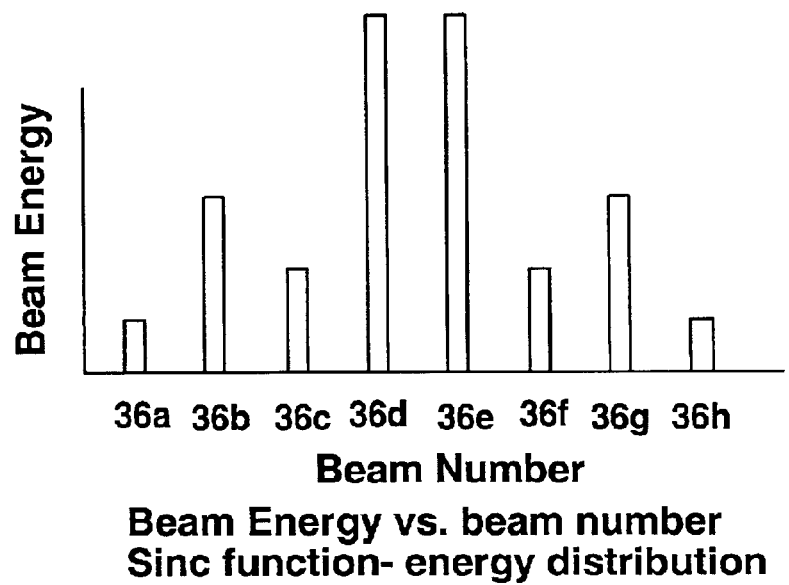

FIG. 14 shows a plot of beam energy versus beam number for a device with an energy distribution varying according to a sinc function (sinc(x)=sin(x)/x). A sinc function energy distribution tends to focus each wavelength to a box-like area since the Fourier transform of a box is a sinc distribution. Focusing each wavelength to a box-like area tends to provide lower crosstalk between adjacent channels. A sinc function beam energy distribution can be provided by appropriately grading the reflector reflectivity, or by other techniques discussed below.

The amplitudes of the emergent beams 36 can be controlled, for example, by fabricating the micromirrors 20 with different reflectivities, or by fabricating a single large mirror 42 with a graded (nonuniform) reflectivity. Alternatively, a spatial light modulator such as an array of liquid crystal light valves can be placed above the reflector 26. Each light valve can control the energy in an emergent beam 36.

It is noted that the reflector 26 can have a reflectivity graded in various ways. For example, the reflector can have a Gaussian graded reflectivity (i.e. the reflectivity varies as a Gaussian function with position), an exponential graded reflectivity, or a triangular graded reflectivity, for example. Many other graded reflectivities are possible.

Figure 15:
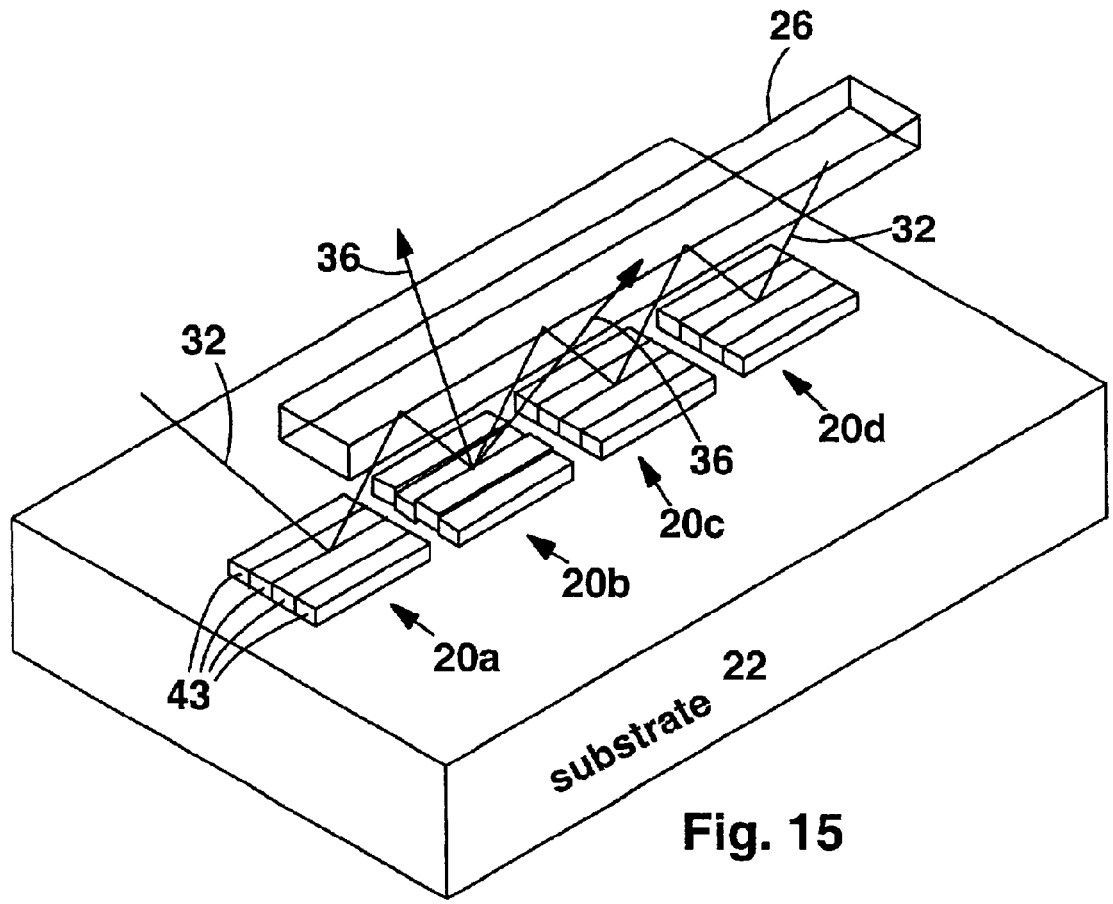
FIG. 15 shows an embodiment of the present invention where each micromirror is replaced with a controllable diffraction grating.

FIG. 15 shows a perspective view of an alternative embodiment of the present invention where each micromirror is capable of independently modulating its reflectivity. This allows independent control of the amplitude of each emergent beam 36. In the device of FIG. 15, each micromirror 20a, 20b, 20c, 20d comprises separately movable mirror diffractive elements 43 (typically at least 4 elements per micromirror). Reflector 26 is a narrow strip aligned over the micromirrors 20. The lens 28 and focal plane are not shown in FIG. 15. The separately movable mirror elements 43 act as a diffraction grating when they are positioned at different heights. In operation, light beam 32 reflects between the reflector 26 and micromirrors 20 when the mirror elements 43 are coplanar. When elements 43 are positioned at different heights (e.g. like micromirror 20b), light beam 32 is partially diffracted. The diffracted light misses the reflector 26 and becomes the emergent beam 36, which is collected by lens 28 (not shown). The undiffracted portion of light beam 32 continues to reflect between the reflector 26 and micromirrors 20. By adjusting the positions of the elements 43, the amount of energy in the emergent beam 36 can be controlled. Specifically, the less coplanar the elements 43, the more energy is present in the corresponding emergent beam 36. If all the micromirrors in the device comprise elements 43, the energy of each emergent beam 36 in the present invention can be independently controlled. For more information on controllable diffraction gratings, and movable mirror elements, reference can be made to U.S. Pat. Nos. 5,459,610 and 5,808,797 to Bloom et al.

It is noted that the diffractive elements 43 can move in unison so that the elements 43 act as a single micromirror. In this way, the elements 43 can provide phase tunability without affecting the energy of the emergent beams 36. So, when a micromirror comprises diffractive elements 43, the diffractive elements can be actuated to provide independent control over energy and phase of the corresponding emergent beam 36.

Figure 16:
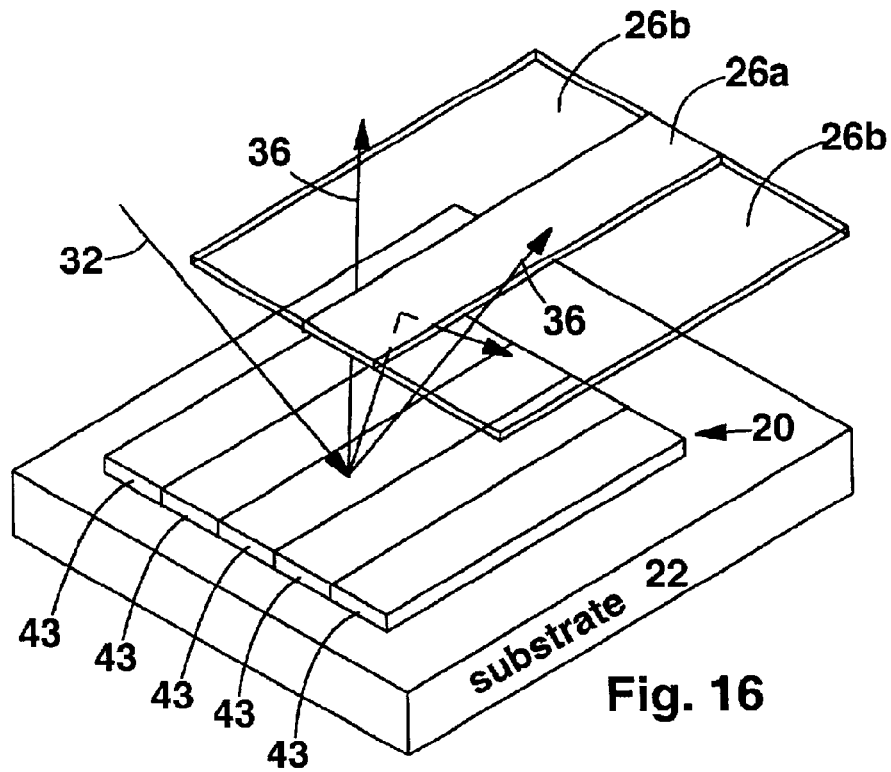
FIG. 16 shows a closeup view of a single controllable diffraction grating in the device of FIG. 15.

FIG. 16 shows a closeup perspective view of a single micromirror 20 comprising diffractive elements 43. Reflector 26 is shown as a layer of material with a highly reflective region 26a and a highly transmissive region 26b. The reflective region 26a is disposed to reflect undiffracted light beam 32; the transmissive region is disposed to transmit diffracted light that forms emergent beam 36. The device of FIG. 16 is not shown to scale; typically, the reflective region 26a will be as wide or wider than the micromirror 20.

Figure 17:
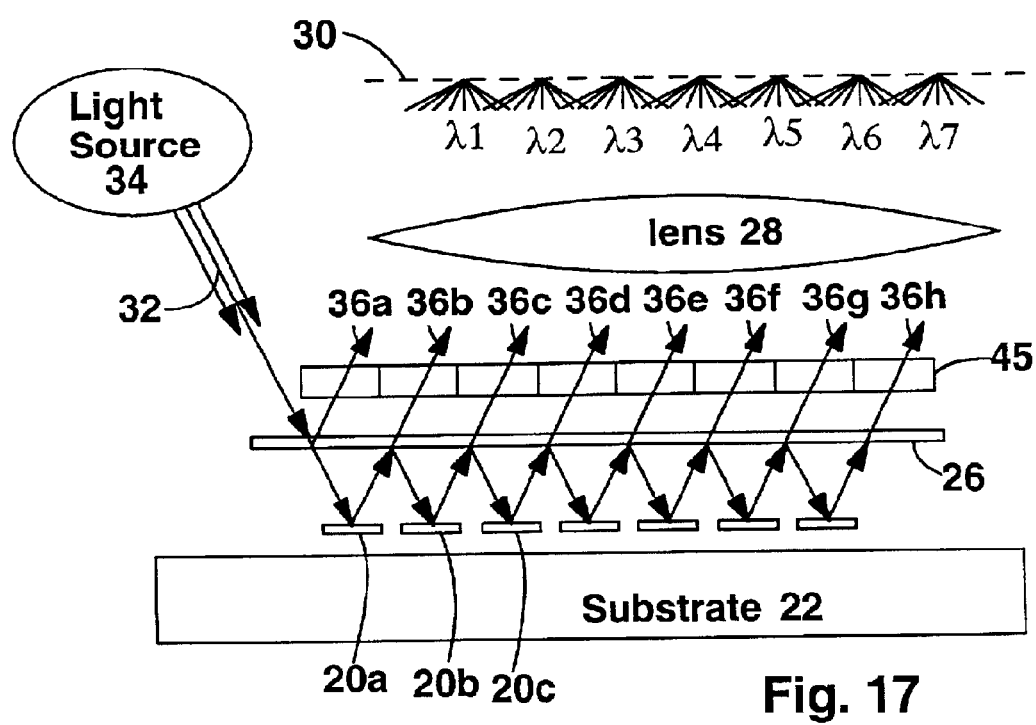
FIG. 17 shows an alternative embodiment having a spatial light modulator for controlling the energy in the emergent beams.

FIG. 17 shows another embodiment of the present invention where the energy in each emergent beam can be independently controlled. Here, a spatial light modulator 45 (SLM) is disposed above the reflector 26. The SLM comprises an array of light valves (e.g. liquid crystal light valves), with each emergent beam 36 passing through a separate light valve. Controlling the opacity or reflectivity of the light valves controls the energy in the corresponding emergent beam 36. Optionally, the SLM 45 and reflector 26 can be combined in a single device where each light valve of the SLM has a variable reflectivity. In this way, the energy of each emergent beam 36 can be controlled without loss of optical energy from the system. By contrast, an SLM with variable opacity will tend to absorb substantial amounts of optical energy, which is undesirable. A device that can function as a variable reflectivity SLM is described in "MEMS-based variable optical interference devices" by Goossen, K. W. Optical MEMS, 2000 IEEE/LEOS International Conference, Pages 17–18. Other SLM devices with variable reflectivity can be made using MEMS technology.

Figure 18:
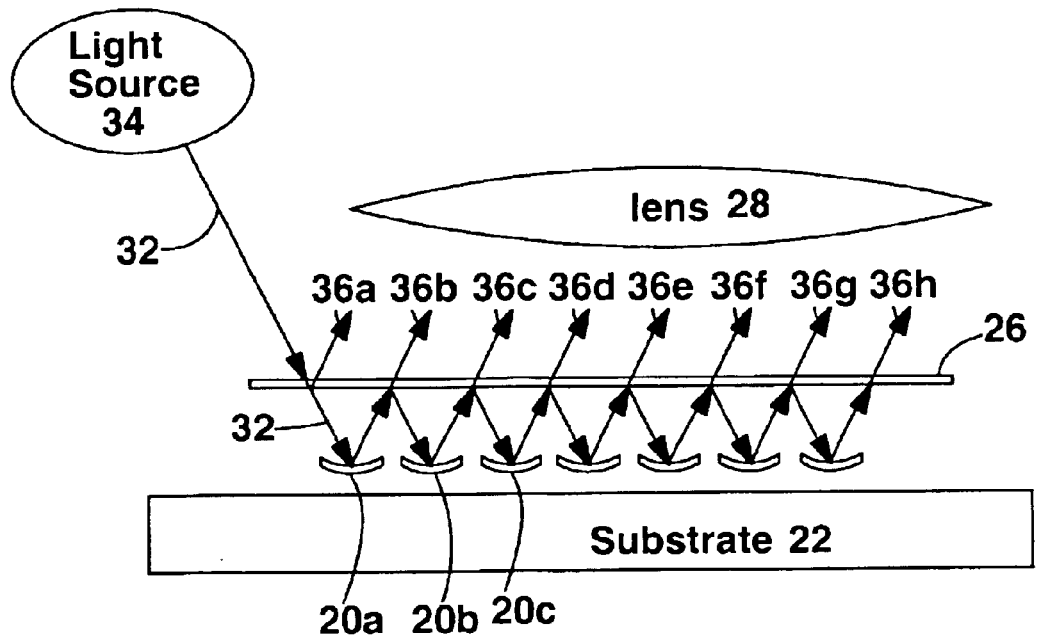
FIG. 18 shows an alternative embodiment where the micromirrors have a concave shape for collimating the light beam.

FIG. 18 shows an alternative embodiment where the micromirrors 20 have a concave shape focusing the light beam 32. Although every micromirror 20 is shown having a concave shape, it is also possible to make a device with both flat and concave micromirrors. For example, every second or third micromirror 20 can have a concave shape, and other micromirrors can be flat. In operation, the concave shape of the micromirrors 20 causes the light beam 32 to be repeatedly refocused. Alternatively, the reflector 26 can have concave indentations for refocusing the light beam 32. It is noted that the mirror 42 of FIG. 4 can have an array of concave shapes for focusing the light beam 32.

Application in Optical Interleaving

The present invention can function as an optical interleaver in which alternate wavelengths (e.g. 20 discrete wavelengths) are divided among 2, 3, 4 or more output ports. For example, wavelengths λ1–λ14 (with δλ of 1 nm) can be divided between two output ports so that 7 wavelengths go to each port In order to function as an optical interleaver, the device must have an FSR smaller than the range of input wavelengths Δλ.

Figure 19:
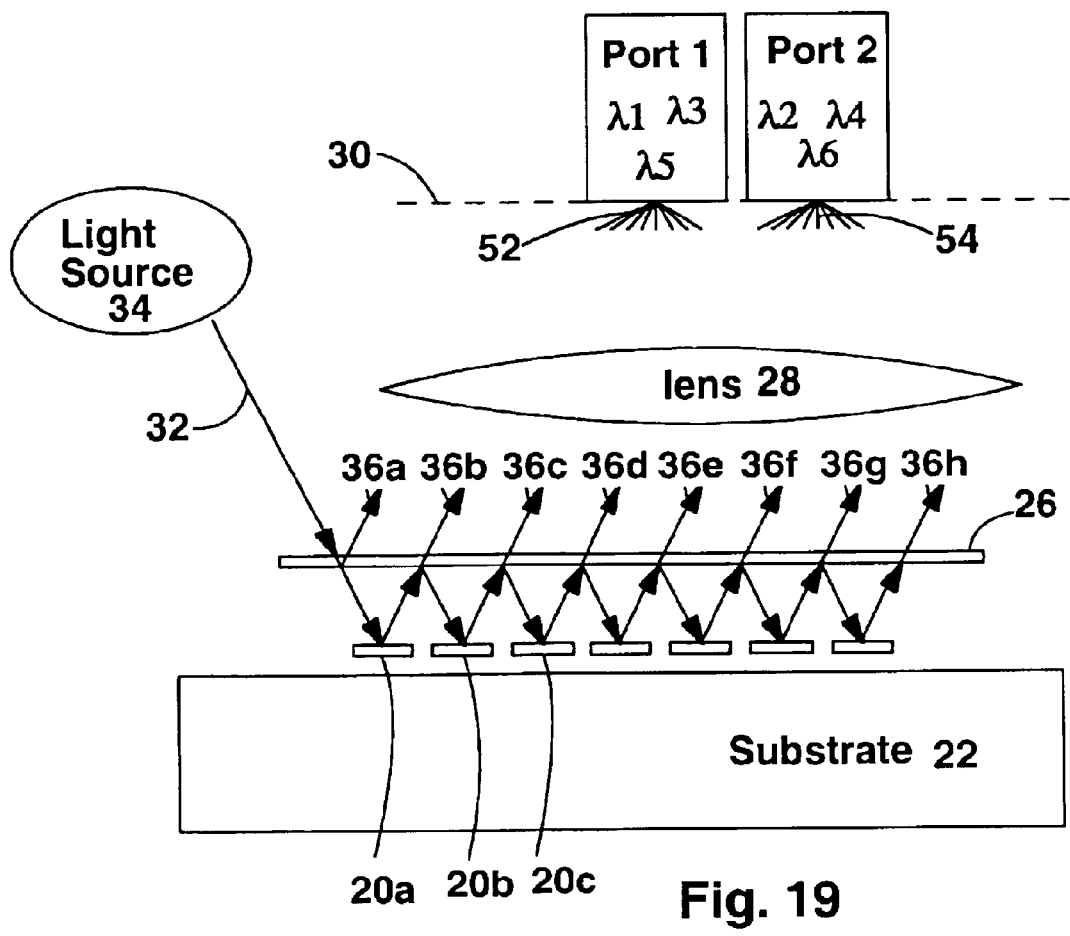
FIG. 19 shows an optical interleaver according to the present invention.

FIG. 19 shows a device configured to function as an optical interleaver. All the input wavelengths are focused to two spots 52, 54, where port 1 and port 2 are located, respectively. In this example, wavelengths λ1–λ6 are in beam 32. Each wavelength λ1–λ6 has δλ of 1 nm for a total bandwidth Δλ of 6 nm. The FSR is 2 nm. Wavelengths λ1, λ3, and λ5 are focused into port 1; Wavelengths λ2, λ4, and λ6 are focused into port 2. Port 1 and port 2 can be optical fibers, photodetectors or any other device for receiving light.

FIG. 20 shows a plot of wavelength versus focal plane position for the device of FIG. 19. The wavelengths λ1–λ6 span 3 FSRs.

FIG. 21 shows a chart illustrating that the wavelengths can be switched between ports by adjusting mirror position. All the mirrors can move up and down together so they are coplanar in all positions.

More generally, the number of ports in to which wavelength channels are separated is equal to $$\#of ports = \frac{FSR}{\delta \lambda},$$

where δλ is the wavelength difference between adjacent channels (assuming all channels have the same wavelength separation). For example, if δλ is 3 nm, and the FSR is 12 nm, then the wavelengths will be separated into 4 ports. If 8 wavelengths are present, each port will receive 2 wavelengths. If 4 wavelengths are present, then each port will receive a single wavelength and the device will function as a multiplexer or demultiplexer as described above. Mirror motion cycles the wavelengths among the ports, but the same wavelengths are always found together.

It is noted that the optical interleaver according to the present invention can have a single large mirror 42 instead of a micromirror array. In fact, an optical interleaver can be very similar to the device of FIG. 4, with the exception that an interleaver will have a smaller FSR compared to the input bandwidth Δλ.

Application in Reconfigurable Optical Filtering

The present invention can be used as a reconfigurable optical filter with a periodic response. Such a filter can be used in wavelength division multiplexing to provide multiple passbands with each passband centered on a wavelength channel. In this application, the FSR is equal to δλ, and all the wavelength channels are focused to the same output port. Such a device is useful for removing unwanted noise between wavelength channels, or for narrowing channel spectral width. Wavelengths between channels are focused to positions outside the output port.

FIG. 22 shows a reconfigurable optical filter according to the present invention. All the wavelengths of interest (channel wavelengths λ1–λ6) are focused to a single output port 56. In this example, δλ is 1 nm, and the FSR is 1 nm.

Figure 23A:
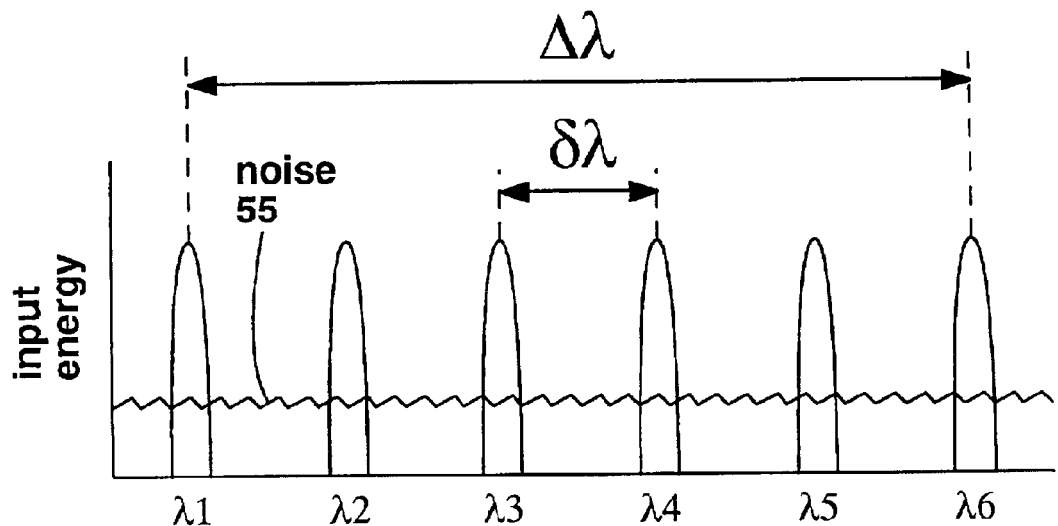
FIGS. 23a and 23b illustrate how the reconfigurable optical filter of FIG. 22 can remove noise from a WDM system.
Figure 23B:
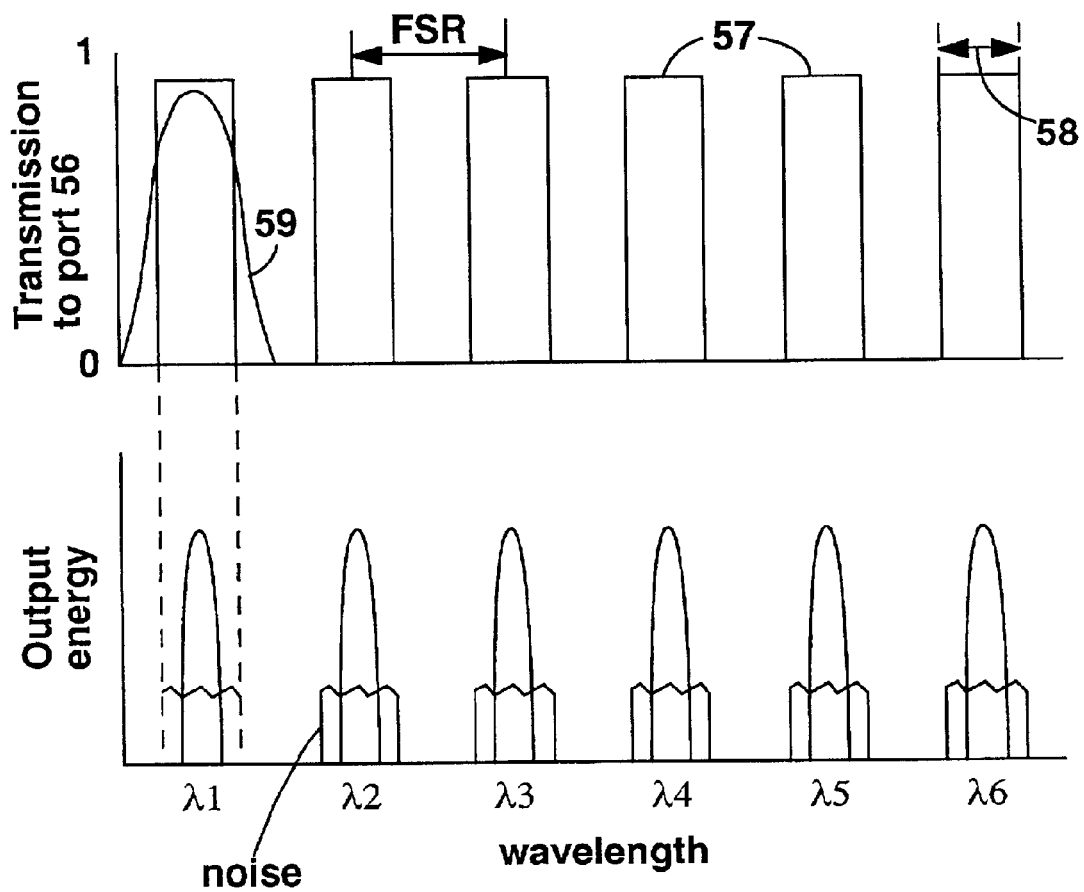

FIG. 23a shows a plot of input energy versus wavelength for input beam 32 of FIG. 22. In WDM applications, the input beam typically has unwanted noise 55 between channel wavelengths. FIG. 23b shows a plot of passbands 57 and output energy versus wavelength. Passbands have a spectral width 58 (necessarily less than the FSR), and typically all the passbands have the same spectral width. The passbands 57 are separated by 1 FSR since there is only one output port 56. Although the passbands are shown having a box shape, they can have many different shapes, such as a Gaussian shape as illustrated by passband 59. Typically, all the passbands in a filter device will have the same shape. In the example of FIGS. 23a–23b, noise between the wavelength channels is removed from the system by being focused in an area of the focal plane away from the output port 56. This results in a reduction in the background noise level, which is seen in the bottom graph of FIG. 23b.

FIG. 24 shows a plot of intensity versus position in the focal plane, further illustrating the behavior of the device of FIG. 22. Solid line 60 represents the intensity distribution of all the wavelengths within the passbands 57. Wavelengths λ1, λ2, λ3, λ4, λ5, and λ6 all have intensity distributions given by solid line 60 Dotted line 62 represents the intensity distribution of all the wavelengths outside the passbands 57. Output port 56 of FIG. 22 receives all the light within area represented by range 64.

The spectral width of the passbands can be changed by changing the port range 64, by positioning the micromirrors 20 to affect the shape of the solid line 60 (which is accomplished by moving micromirrors 20), or by changing the spot size. Spot size can be altered by changing the number of emergent beams 36, or by changing the energy distribution among the emergent beams 36, as described in reference to FIGS. 9a and 9b. Spot size can also be changed by changing the focal length of the lens 28.

In the reconfigurable filter, the passband width is determined by the port range, window width, and the FSR approximately according to the following equation $$\text{Passband width} = \frac{P_r}{G} FSR$$

where $P_r$ is the port range, G is the window width, and FSR is the free spectral range.

According to the present invention, the shape of the spatial energy distribution (e.g. solid line 60 in FIG. 24) is a function of the vertical positions of the micromirrors 20. A technique for calculating micromirror positions from desired energy distribution shapes is described below in the 'Theory and Algorithms' section. The filter of the present invention is reconfigurable because the shape of the energy distribution 60, and hence the passband widths, is adjustable. Also, FSR is adjustable by changing T.

The multiplexer, interleaver, and filter of the present invention operate according to similar theory (described below), but operate in different regimes. The multiplexer has a FSR equal to or larger than input wavelength range $\Delta\lambda$, the filter has a FSR smaller than input wavelength range $\Delta\lambda$. In the multiplexer, the ratio FSR/$\delta\lambda$ gives the number of ports. In the filter and in the interleaver, the ratio $\Delta\lambda$/FSR gives approximately the number of wavelengths that are present at each output port.

It is noted that the optical filter according to the present invention can have a single large mirror 42 instead of a micromirror array. In fact, an optical filter can be very similar to the device of FIG. 4, with the exception that a filter will typically have a much smaller FSR than a demultiplexer/multiplexer.

Theory and Algorithms

For convenience, we repeat here important design parameters of the present invention.

| Name | Description | Typical value |
|---|---|---|
| T | separation length between mirror-array and reflecting film | 10 μm ~ 2.5 mm |
| w | Beam width of incident light | 20 ~ 75 μm |
| λ | Light wavelength | 800 nm or 1.55 μm |
| N | Total number of micromirrors | 1 ~ 1000 |
| A | Mirror period | 50 ~ 200 μm |
| θ | Incident angle of incident beam | 2 ~ 15° |

If one micromirror is moved vertically, the optical path length changes to give a phase-shift to the corresponding emergent beam. In addition to this phase-shift induced by the mirror movement, there is an intrinsic phase-shift due to the free-propagation of light between micromirrors 20 and reflector 26. This phase shift occurs even when there is no micromirror movement. In the case where the micromirrors are not displaced, the optical path length difference between two adjacent emergent beams is Path length difference=$\Delta=2T \cos\theta$, the optical phase difference between two adjacent emergent beams is $$\Delta \frac{2\pi}{\lambda}$$

radians for wavelength λ.

The nominal optical path length difference Δ, measured when there is no micromirror displacement, is in this example the same for all adjacent emergent beams. Δ is a constant, once the incident angle θ and separation length T are determined. The corresponding phase difference is $$\delta = \frac{2\pi}{\lambda}\Delta.$$

By taking the phase of the first emerging beam as a reference, the relative phase of nth beam is (n−1)δ or, equivalently, $$\sum_{2}^{n} \frac{2\pi}{\lambda}\Delta$$

when there is no mirror movement (summation starting at 2 implies that the light beam reflects from the reflector 26 before the first micromirror). If we move the micromirrors, an additional phase will be added to (or subtracted from) this free space propagation phase.

If displacement of the nth mirror from its original position is denoted as h(n), the additional amount of phase shift made by mirror repositioning is equal to $$\phi(n) = \frac{2\pi}{\lambda}(2h(n)\cos\theta).$$

FIG. 25 shows a diagram of a micromirror at two different vertical positions illustrating how this equation is derived.

The important thing to remember here is that all emergent beams are tapped from a single light beam 32, and the effect of micromirror repositioning propagates to all the emergent beams downstream. In other words, the phase term of nth beam is equal to $$\sum_{k=2}^{n} (\delta + \phi(k)).$$

From this expression, it follows that the phasor representation of nth beam can be written as $E_n e^{j\psi(n)} e^{j\delta(n-1)}$, where ψ(n) is the effective phase shift of the nth beam accumulated from the phase shifts from upstream micromirror reflections. That is, $$\psi(n) = \sum_{k=2}^{n} \phi(k).$$

The amplitude is controlled by the reflection coefficient of the thin film (typically fixed, but the invention is not so limited), and the phase is controlled by micromirror vertical position, i.e. we can change the phase but not the amplitude of the emergent beams in this implementation.

As described above, the micromirror period A (equal to 2T tan θ), should be greater than beam width w so that adjacent emergent beams are not overlapping. FIG. 26 illustrates this arrangement. If the emergent beams are not overlapping, the emergent beams can be modeled in the far field as a multiple-slit diffraction problem, which is well-understood in the field of optics. The 'slit width', b, is given by $$b = \frac{w}{\cos\theta},$$

where w is the beam width; for small $\theta$, b≅w. The separation distance between the beams is a=2T tan$\theta$.

Assuming the device can be modeled as a multiple-slit system within the Fraunhofer approximation, the electric field (far field) E measured at angle $\alpha$ and distance R after focusing (or transforming) lens can be written as:

$$E(R, \sigma, t) = \text{Im}\left[(bCe^{j(wt-kR)})\left(\frac{\sin\beta}{\beta}\right)\left(\sum_{n=0}^{N-1} E_{n+1} e^{j\psi(n+1)} e^{j\alpha n}\right)\right] \quad \text{Eq. 1}$$

where:
$\alpha = \delta + 0.5ka \sin\sigma$, $\beta = 0.5kb \sin\sigma$, $$k = \frac{2\pi}{\lambda},$$

$\omega$ is angular velocity, t is time, and C is a constant. Significantly, it is noted that the last term of Eq. 1

$$\sum_{n=0}^{N-1} E_{n+1} e^{j\psi(n+1)} e^{j\alpha n}$$

has a form of a discrete-time Fourier transform. For more information on discrete-time Fourier transforms, and their application to digital signal processing, reference can be made to the following publications: "Discrete-Time Signal Processing" by Oppenheim et al. and published by Prentice Hall, 1999, and "Optical Filter Design and Analysis: A Signal Processing Approach" by Christie K. Madsen, Jian H. Zhao, Christi K. Madsen, Wiley Series in Microwave and Optical Engineering. In the present invention, there is an analogy between combining the emergent beams, and the behavior of a transversal filter (TF). A transversal filter combines multiple identical signals having different amplitudes and phase delays. More specifically, the time delay between each tap in a TF is proportional to spacing T in the present invention. The impulse response in a TF is analogous to the set of emergent beams expressed as complex numbers. Theoretical understanding of transversal filters is well known in the art.

Since the far field pattern in the focal plane is given by a discrete time Fourier transform, wavelengths are focused to different points in the focal plane, and wavelengths can be moved (cycled) in the focal plane by phase adjustments to the emergent beams.

In the present invention, a certain intensity distribution in the focal plane may be desired. This is particularly true in the reconfigurable filter application, where intensity distribution in the focal plane influences the passband widths. In many applications of the present invention, it is desirable to adjust the mirror heights so that each wavelength has a certain intensity distribution (i.e. spot shape).

A technique for determining micromirror heights from a desired intensity distribution can be summarized in 4 steps:

1) Select upper and lower bounds on far field pattern in the focal plane.

2) Select number of emergent beams (typically N or N+1).

3) Express each emergent beam as a single complex number. Each complex number includes amplitude and phase information. It is assumed that all emergent beams are parallel.

4) Find values for the complex numbers so that a transform (e.g. Fourier transform, discrete-time Fourier transform, z-transform, or Laplace transform) of the series of complex numbers satisfies the upper and lower bounds selected in step (1). If desired, adjustments can be restricted to phase adjustments (optionally, adjustments can include both amplitude and phase adjustments). Techniques for performing this calculation are known in the art and are identified below. The transform is selected to describe the transfer function of the focusing device (i.e., lens 28).

This technique assumes that all the emergent beams have the same angle $\theta$.

Figure 27:
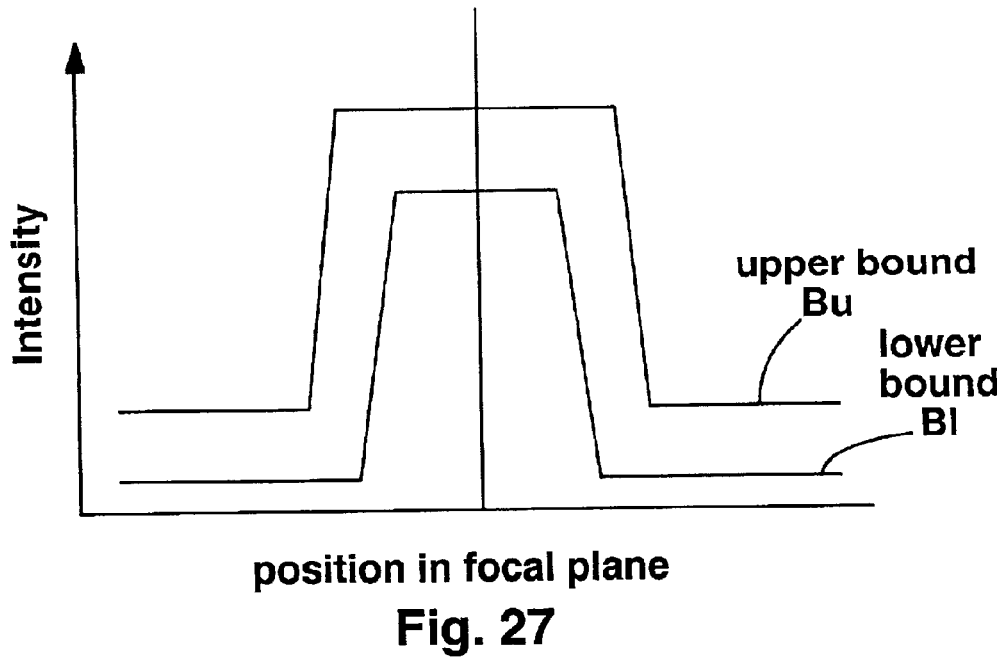

FIG. 27 shows a diagram of upper bound $B_u$ and lower bound $B_l$ for the far-field pattern for a single wavelength. In the multiplexer/demultiplexer device of the present invention, each wavelength will have approximately the same upper and lower bound shape, although for different wavelengths the bounds will be in different locations in the focal plane. In the filter application, the upper and lower bounds will have the same shape and be in the same location for all wavelengths in the passbands.

In the present invention, micromirror positions are determined so that each wavelength or set of wavelengths satisfies the corresponding upper bound $B_u(x)$ and lower bound $B_l(x)$, where x indicates position in the focal plane. The upper and lower bounds are functions of the focal plane position x. In order to find the micromirror positions that satisfy the upper bound $B_u(x)$ and lower bound $B_l(x)$, the emergent beams are expressed as a series of complex numbers ($u_1, u_2, u_3, \ldots u_N$). Each complex number includes amplitude and phase information:

$$U = (u_1, u_2, u_3, \ldots u_N).$$

Then, we must find values of ($u_1, u_2, u_3, \ldots u_N$) that satisfy the following equation:

$$B_l(x) < |F\{U\}| < B_u(x),$$

Where 'F' represents a discrete-time Fourier transform or other transform function (e.g. Laplace transform, Z-transform) that describes the focusing device. $F\{U\}$ is understood to be a function of x (position in the focal plane) since the present invention maps wavelength into position in the focal plane. $F\{U\}$ is in general a complex number, so it is usually necessary to compare absolute values as shown. There are two possible cases: (1) adjustment of both amplitude and phase of the emergent beams to satisfy $B_u$ and $B_l$, or (2) adjustment of phase only to satisfy $B_u$ and $B_l$. Each case is more fully explained below.

Case (1): Adjustment of Amplitude and Phase

In this case, the problem is well analyzed in digital signal processing literature. Specifically, the problem is solved in connection with transversal filters. For more information, reference can be made to "Discrete-Time Signal Processing" by Oppenheim et al. In the present invention, phase is adjusted by vertical positioning of the micromirrors, and amplitude can be adjusted by reconfigurable diffraction gratings (as described with reference to FIGS. 15–16), or spatial light modulators.

Case (2): Adjustment of Phase Only

In this case, only the phases are adjusted, and the problem can be restated as:

Find $(u_1, u_2, u_3, \ldots U_N)$ for $B_1(x)<|F\{U\}|<B_u(x)$, where $|u_1|, |u_2|, |u_3|, \ldots |u_N|$ are given.

Techniques for solving this problem are known in the art. For example, Bucci et al. describe a technique for solving this problem in "Intersection Approach to Array Pattern Synthesis", IEEE Proc., pt. H, vol. 137, no. 6, pp. 349–357, December 1991, which is hereby incorporated by reference.

It is noted that, if certain bounds $B_u$, $B_1$ require micromirrors to be non-coplanar (i.e. micromirrors have different heights and associated values of T), then wavelength cycling is provided by moving all the micromirrors the same amount, so that relative vertical positions of the micromirrors remain constant.

It is noted in the filter embodiment, micromirror positions for a certain passband shape can be determined by appropriately shaping the upper bound and lower bound. The passbands can have many different shapes by properly positioning the micromirrors.

Alternative Embodiments

Figure 28:
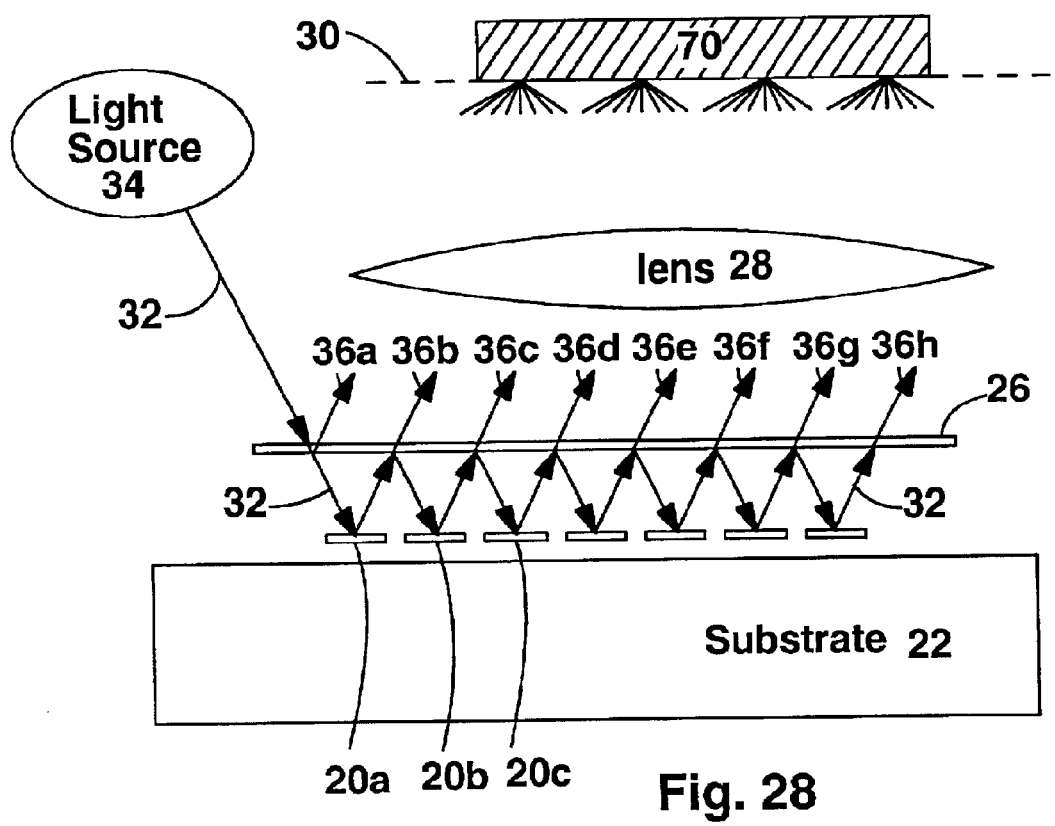
FIG. 28 shows a reconfigurable dispersion compensator according to the present invention.

FIG. 28 shows an embodiment of the present invention functioning as a dispersion compensator. A mirror 70 is disposed at the focal plane 30. Light from the lens 28 is focused on the mirror 70, which reflects the light back into the lens 28. The light then returns along the input beam 32, or close to the input beam 32. The dispersion in the present device can be adjusted by moving the wavelengths in the focal plane, which is accomplished by moving the micromirrors 20, or in another embodiment, by moving the single large mirror 42. Dispersion compensation is described in "Chromatic Dispersion Compensator using Virtually Imaged Phased Array" by M. Shirasaki in IEEE Photonics Technology Letters, vol. 9, no. 12, pp. 1598–1600, December 1997, which is hereby incorporated by reference.

Figure 29:
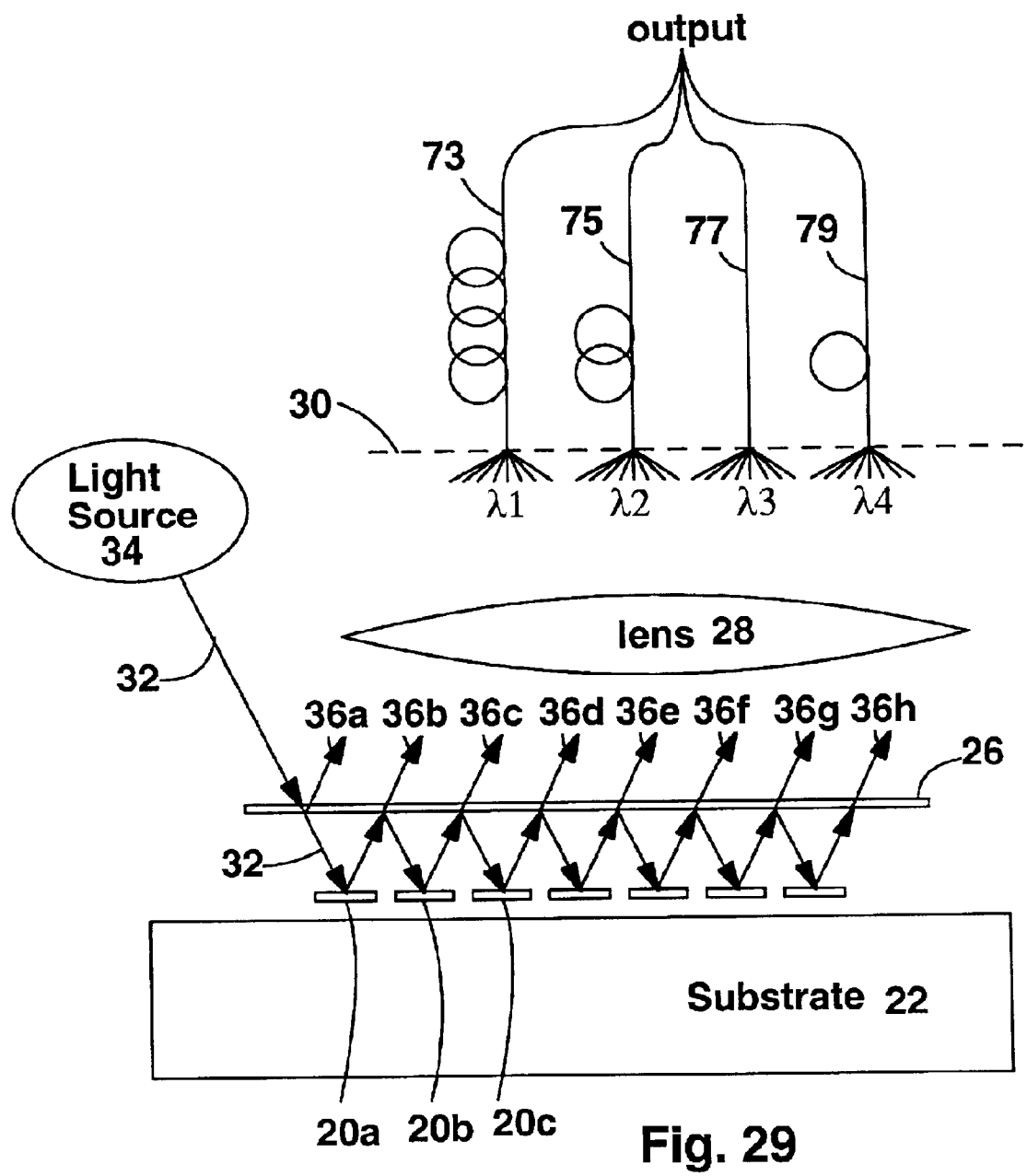
FIG. 29 shows a reconfigurable OCDMA encoder/decoder according to the present invention.

FIG. 29 shows an embodiment of the present invention used as an optical code-division multiple access (OCDMA) encoder. Optical fibers 73, 75, 77, 79 of different lengths are disposed at the focal plane to receive different wavelengths. The optical fibers 73, 75, 77, 79 provide different time delays to the different wavelengths. The device shown in FIG. 19 can provide temporal/wavelength two-dimensional codes for incoherent OCDMA systems. Two-dimensional codes can outperform single dimension wavelength OCDMA codes. Specifically, two dimensional codes can have a higher number of users for a given bit-error rate. For more information on two-dimensional temporal/wavelength coding techniques, reference can be made to "Wavelength-Time Spreading Optical CDMA System using Wavelength Multiplexers and Mirrored Fiber Delay Lines" by Yu et al. in IEEE Photonics Technology Letters, vol. 12, no. 9, 2000, which is hereby incorporated by reference. The device of FIG. 29 can also function as a decoder, if light travels in a direction from the optical fibers to the light source.

Figure 30:
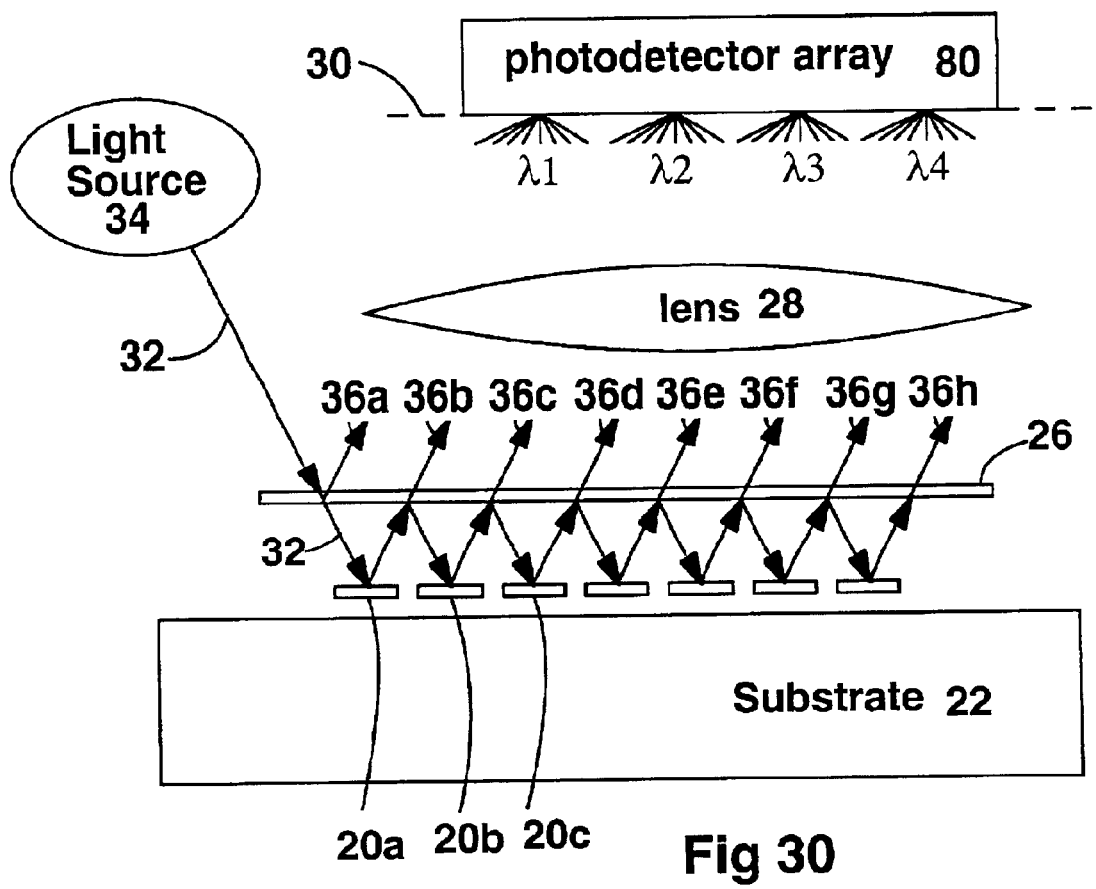
FIG. 30 shows a spectrometer according to the present invention.

FIG. 30 shows a spectrometer according to the present invention. In this embodiment, a photodetector array 80 is disposed at the focal plane. Different photodetectors in the photodetector array will receive different wavelengths.

Figure 31:
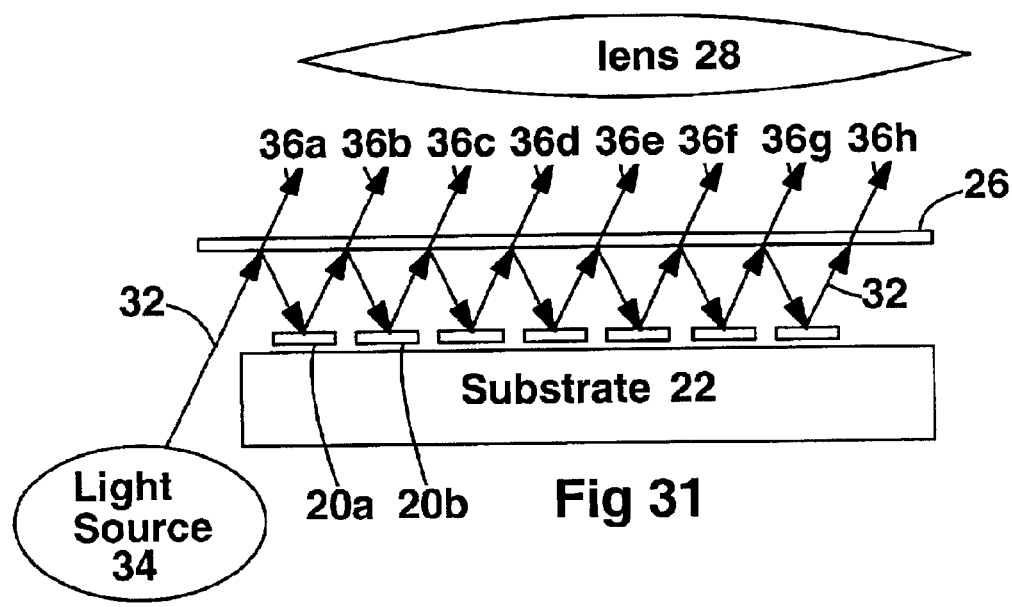
FIG. 31 shows an embodiment where the light source is disposed behind the substrate.

FIG. 31 shows an embodiment of the invention where the light source 34 is disposed behind the substrate 22. In this embodiment, the number of emergent beams 36 will be N+1, where N is the number of micromirrors. Alternatively, the light beam 32 can travel through the substrate 22, if the substrate is transparent. For example, if the substrate 22 is made of silicon or glass, then the light beam 32 can travel through the substrate 22.

Figure 32:
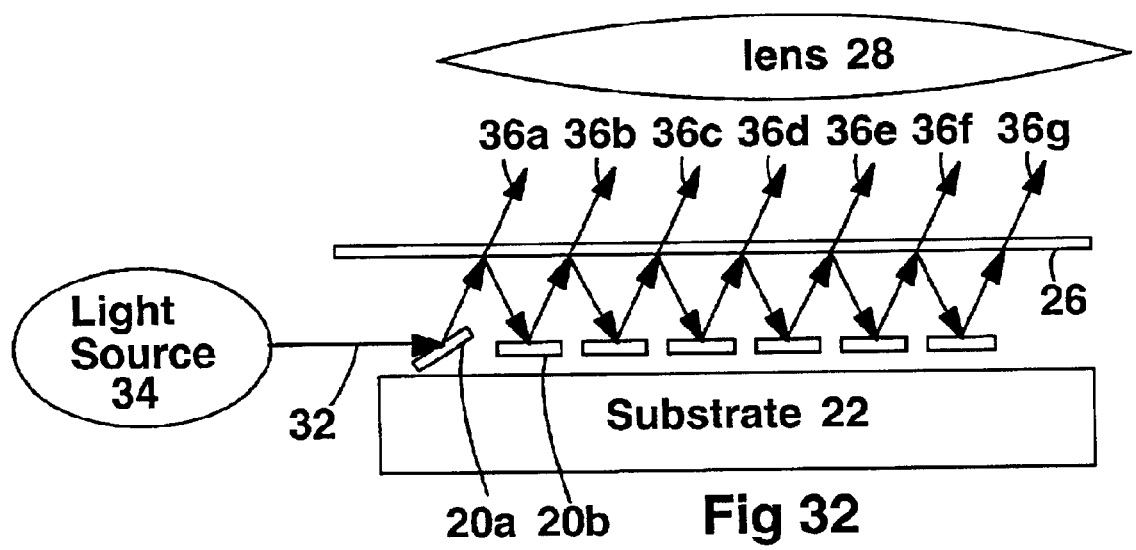
FIG. 32 shows an embodiment where a first reflection micromirror (the first micromirror to receive light beam 32) is tiltable.

FIG. 32 shows an alternative embodiment where a first reflection micromirror 20a is tiltable. The light beam 32 is initially parallel with the substrate 22, and the tiltable micromirror 20a provideds beam steering. In this embodiment, mechanical alignment between the light source 34 and the substrate 22 is not as critical. In fact, the light source 34 can be located in any position relative to the substrate, provided that the light beam 32 is directed toward the first reflection micromirror 20a.

Figure 33:
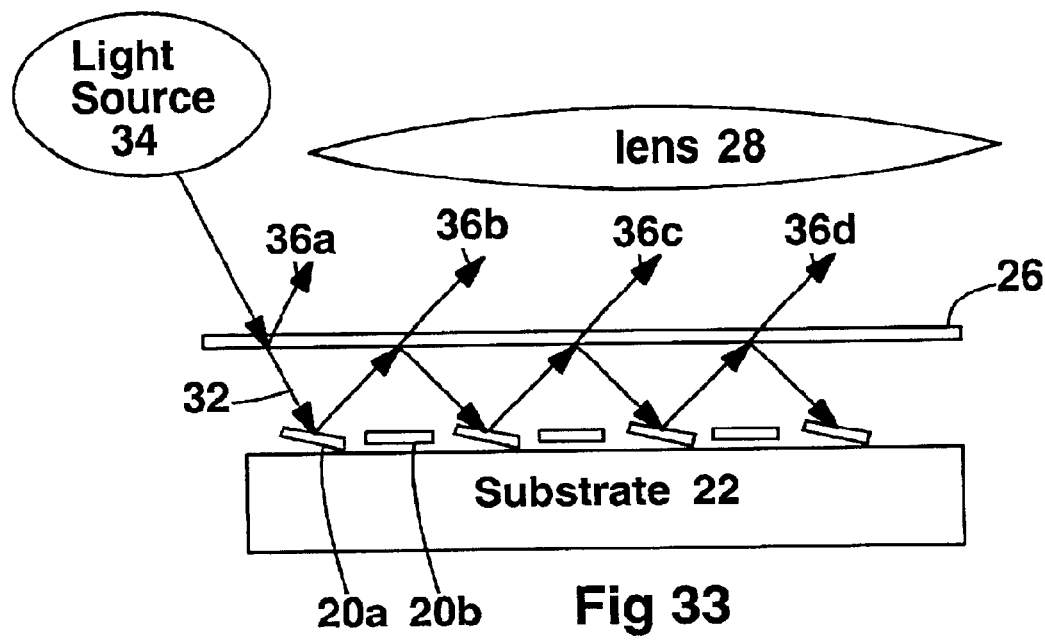
FIG. 33 shows an embodiment where the micromirrors are tilted so that only every second micromirror is hit by the light beam. In this embodiment, all the micromirrors, or a portion of the micromirrors can be tiltable.

FIG. 33 shows another embodiment of the present invention having multiple tiltable micromirrors 20. In the specific implementation of FIG. 33, alternate micromirrors are tilted so that the light beam 32 hits every second micromirror. This results in fewer emergent beams. Alternatively, the micromirrors can be tilted to hit every third or fourth micromirror. In this way, the number and spacing of emergent beams 36 can be adjusted dynamically.

FIG. 34 shows another embodiment of the present invention where the reflector 26 is not parallel with the array of micromirrors 20. In this embodiment, the micromirrors 20 are tilted so that the light beam 32 does not 'walk off' the micromirrors as it travels. The tilt of the micromirrors 20 maintains a consistent spacing between adjacent emergent beams 36. The angle of the reflector 26 can be in the range of ±15 degrees or ±30 degrees. It is noted that the reflector 26 can be angled the opposite direction, i.e. so that the light beam 32 travels from a narrow gap to a wide gap. It is also noted that the angled reflector 26 tends to increase the FSR of the device (compared to a device having a spacing T equal to the smallest spacing in a device with an angled reflector). In fact, the reflector 26 can be angled to increase the FSR and thereby improve the device for applications requiring a high FSR.

It is preferred for the mirror 42 or micromirrors 20 to have as large a reflectivity as possible. Light not reflected by the mirror or micromirrors is lost from the system, which is not desirable. For some devices, however, reflectivity of the mirror or micromirrors can be as low as 20%.

It will be clear to one skilled in the art that the above embodiment may be altered in many ways without departing from the scope of the invention. Accordingly, the scope of the invention should be determined by the following claims and their legal equivalents.

What is claimed is:

1. An optical device comprising:
   a) a partially reflecting, partially transparent reflector;
   b) a movable mirror spaced apart from the reflector, wherein the movable mirror can move to vary a spacing T between the reflector and movable mirror;
   c) a light collimator for projecting a light beam between the movable mirror and the reflector at an oblique angle so that the light beam travels by reflecting between the reflector and movable mirror;
   wherein the light beam reflects from the mirror at least twice, and each reflection occurs in a different position on the mirror.

2. The optical device of claim 1 wherein the oblique angle is in the range of 1–15 degrees from vertical.

3. The optical device of claim 1 wherein the movable mirror comprises a micromirror array, and wherein each micromirror in the array is separately movable vertically.

4. The optical device of claim 3 wherein the number of micromirrors is in the range of 2–1000.

5. The optical device of claim 3 wherein the micromirrors are disposed so that the light beam reflects at most once from each micromirror.

6. The optical device of claim 3 wherein the micromirror array and the reflector are planar parallel.

7. The optical device of claim 3 wherein at least one micromirror is tiltable.

8. The optical device of claim 3 wherein a first reflection micromirror is tiltable.

9. The optical device of claim 3 wherein at least 25% of the micromirrors are tiltable.

10. The optical device of claim 1 wherein:
a) the movable mirror comprises a micromirror array,
b) each micromirror in the array is separately movable,
c) at least one micromirror comprises a controllable diffraction grating.

11. The optical device of claim 10 wherein the reflector comprises a region of high reflectivity, and a region of low reflectivity.

12. The optical device of claim 11 wherein the reflector is disposed so that light diffracted by the controllable diffraction grating passes through the region of low reflectivity.

13. The optical device of claim 1 wherein the device has a free spectral range in the range of 0.2–150 nm.

14. The optical device of claim 1 wherein the device has a free spectral range that is an integer multiple of a bandwidth of the light beam.

15. The optical device of claim 1 wherein the mirror and reflector are spaced apart a distance in the range of 10–1500 microns.

16. The optical device of claim 1 wherein the reflector has a uniform reflectivity.

17. The optical device of claim 1 wherein the reflector has a nonuniform reflectivity.

18. The optical device of claim 17 wherein the reflector has a linearly graded reflectivity.

19. The optical device of claim 1 further comprising a spatial light modulator disposed so that the reflector is between the spatial light modulator and the movable mirror.

20. The optical device of claim 1 wherein the movable mirror has a concave area for focusing the light beam.

21. The optical device of claim 1 wherein the reflector comprises a light valve having a variable reflectivity.

22. The optical device of claim 1 wherein the reflector and the movable mirror are planar parallel.

23. The optical device of claim 1 wherein the reflector and the movable mirror are not parallel.

24. An optical device comprising:
a) a partially reflecting, partially transmitting reflector;
b) a movable mirror spaced apart from the reflector, wherein the movable mirror can move to vary a spacing T between the reflector and movable mirror;
c) a light collimator for projecting a light beam between the movable mirror and the reflector at an oblique angle so that the light beam travels by reflecting between the reflector and movable mirror, and wherein a plurality of spaced apart emergent beams are produced by transmission of the light beam through the reflector;
d) a lens for receiving and focusing the emergent beams at a focal plane.

25. The optical device of claim 24 wherein adjacent emergent beams overlap less than 10% at the reflector.

26. The optical device of claim 24 further comprising an optical fiber disposed at the focal plane for receiving light from the lens.

27. The optical device of claim 24 further comprising a mirror at the focal plane so that the optical device provides dispersion.

28. The optical device of claim 24 wherein the oblique angle is in the range of 1–15 degrees from vertical.

29. The optical device of claim 24 wherein the movable mirror comprises a micromirror array, and wherein each micromirror is separately movable vertically.

30. The optical device of claim 29 wherein the number of micromirrors is in the range of 2–1000.

31. The optical device of claim 29 wherein the micromirrors are disposed so that the light beam reflects at most once from each micromirror.

32. The optical device of claim 29 wherein at least one micromirror is tiltable.

33. The optical device of claim 29 wherein a first reflection micromirror is tiltable.

34. The optical device of claim 29 wherein at least 25% of the micromirrors are tiltable.

35. The optical device of claim 24 wherein:
a) the movable mirror comprises a micromirror array,
b) each micromirror in the array is separately movable,
c) at least one micromirror comprises a controllable diffraction grating.

36. The optical device of claim 35 wherein the reflector comprises a region of high reflectivity, and a region of low reflectivity.

37. The optical device of claim 36 wherein the reflector is disposed so that light diffracted by the controllable diffraction grating passes through the region of low reflectivity.

38. The optical device of claim 24 wherein the device has a free spectral range in the range of 0.2–150 nm.

39. The optical device of claim 24 wherein the device has a free spectral range that is an integer multiple of a bandwidth of the light beam.

40. The optical device of claim 24 wherein the light beam reflects from the mirror at least twice, and each reflection occurs in different positions on the mirror.

41. The optical device of claim 24 wherein the mirror and reflector are spaced apart a nominal distance in the range of 10–2500 microns.

42. The optical device of claim 24 wherein the reflector has a uniform reflectivity.

43. The optical device of claim 24 wherein the reflector has a nonuniform reflectivity.

44. The optical device of claim 43 wherein the reflector has a linearly graded reflectivity.

45. The optical device of claim 43 wherein the reflector has reflectivity graded so that the emergent beams have approximately equal energy.

46. The optical device of claim 43 wherein the reflector has reflectivity graded so that the emergent beams have approximately a sinc function energy distribution.

47. The optical device of claim 24 further comprising a plurality of optical fibers at the focal plane, each fiber having a different length, and each fiber receiving a different wavelength from the lens, so that the device provides an optical code division multiple access encoding function.

48. The optical device of claim 24 further comprising a light valve for adjusting energy in at least one emergent beam.

49. The optical device of claim 24 further comprising a spatial light modulator disposed between the reflector and the lens.

50. The optical device of claim 24 wherein the movable mirror has a concave area for focusing the light beam.

51. The optical device of claim 24 wherein the reflector comprises a light valve having a variable reflectivity.

52. The optical device of claim 24 wherein the reflector and the movable mirror are planar parallel.

53. The optical device of claim 24 wherein the reflector and the movable mirror are not parallel.

54. An optical device comprising:
a) a partially reflecting, partially transmitting reflector;
b) an array of separately movable micromirrors spaced apart from the reflector, wherein each micromirror can move to vary a spacing T between the reflector and movable micromirror;

c) a light collimator for projecting a light beam between the movable mirror and the reflector at an oblique angle so that the light beam travels by reflecting between the reflector and movable micromirrors, and wherein a plurality of spaced apart emergent beams are produced by transmission of the light beam through the reflector;

d) a lens for receiving and focusing the emergent beams.

55. The optical device of claim 54 wherein the micromirrors and light beam collimator are disposed so that the light beam reflects at most once from each micromirror.

56. The optical device of claim 54 wherein adjacent emergent beams overlap less than 10% at the reflector.

57. The optical device of claim 54 further comprising a mirror at the focal plane so that the optical device provides dispersion.

58. The optical device of claim 54 wherein at least one micromirror comprises a controllable diffraction grating.

59. The optical device of claim 58 wherein the reflector comprises a region of high reflectivity, and a region of low reflectivity.

60. The optical device of claim 59 wherein the reflector is disposed so that light diffracted by the controllable diffraction grating passes through the region of low reflectivity.

61. The optical device of claim 54 wherein the device has a free spectral range in the range of 0.2–150 nm.

62. The optical device of claim 54 wherein the reflector has a uniform reflectivity.

63. The optical device of claim 54 wherein the reflector has a nonuniform reflectivity.

64. The optical device of claim 63 wherein the reflector has a linearly graded reflectivity.

65. The optical device of claim 63 wherein the reflector has reflectivity graded so that the emergent beams have approximately equal energy.

66. The optical device of claim 63 wherein the reflector has reflectivity graded so that the emergent beams have approximately a sinc function energy distribution.

67. The optical device of claim 54 further comprising a photodetector array disposed at the focal plane.

68. The optical device of claim 54 further comprising a light valve for adjusting energy in at least one emergent beam.

69. The optical device of claim 54 further comprising a spatial light modulator disposed between the reflector and the lens.

70. The optical device of claim 54 wherein at least one micromirror has a concave shape.

71. The optical device of claim 54 wherein the reflector comprises a spatial light valve having a variable reflectivity.

72. The optical device of claim 54 wherein a first reflection micromirror is tiltable.

73. The optical device of claim 54 wherein at least 25% of the micromirrors are tiltable.

74. The optical device of claim 54 wherein at least one micromirror is tiltable.

75. The optical device of claim 74 wherein each tiltable micromirror is independently tiltable.

76. The optical device of claim 54 wherein the reflector and the movable mirror are planar parallel.

77. The optical device of claim 54 wherein the reflector and the movable mirror are not planar parallel.

* * * * *